US 12,044,195 B2

(12) United States Patent
Smith et al.

(10) Patent No.: US 12,044,195 B2
(45) Date of Patent: Jul. 23, 2024

(54) FUEL HEATING APPARATUS AND METHODS

(71) Applicant: CT ENERGY HOLDINGS, LLC, Franklin, TN (US)

(72) Inventors: Todd E. Smith, Franklin, TN (US); Calvin Whitaker, Milwaukee, WI (US)

(73) Assignee: CT Energy Holdings, LLC, Franklin, TN (US)

( * ) Notice: Subject to any disclaimer, the term of this patent is extended or adjusted under 35 U.S.C. 154(b) by 0 days.

(21) Appl. No.: 18/217,759

(22) Filed: Jul. 3, 2023

(65) Prior Publication Data
US 2023/0349345 A1 Nov. 2, 2023

Related U.S. Application Data

(63) Continuation-in-part of application No. 16/357,922, filed on Mar. 19, 2019, now Pat. No. 11,725,613, (Continued)

(51) Int. Cl.
F02M 31/125 (2006.01)
B01D 35/00 (2006.01)
B01D 35/18 (2006.01)
F01P 7/14 (2006.01)
F02M 31/16 (2006.01)
F02M 37/00 (2006.01)
F02M 37/30 (2019.01)
F02M 37/32 (2019.01)

(52) U.S. Cl.
CPC ........... *F02M 31/16* (2013.01); *B01D 35/005* (2013.01); *B01D 35/18* (2013.01); *F01P 7/14* (2013.01); *F02M 31/125* (2013.01); *F02M 37/0023* (2013.01); *F02M 37/0035* (2013.01); *F02M 37/0052* (2013.01); *F02M 37/30* (2019.01); *F02M 37/32* (2019.01); *Y02T 10/12* (2013.01)

(58) Field of Classification Search
CPC ........ F02M 31/16; F02M 37/32; F02M 37/30; B01D 35/005
USPC ........................................................ 123/557
See application file for complete search history.

(56) References Cited

U.S. PATENT DOCUMENTS 3,253,647 A * 5/1966 Deshaies ............... F02M 1/00
165/104.31
4,594,991 A * 6/1986 Harvey ................. F02M 31/18
123/557

(Continued)

*Primary Examiner* — Mahmoud Gimie
(74) *Attorney, Agent, or Firm* — Holland & Knight LLP

(57) ABSTRACT

A fuel heating apparatus including a heat exchanger body having a first removable end plate, a main body, and a second removable end plate opposite the first removable end plate. The first and second removable end plates are secured to opposing sides of the heat exchanger main body by a plurality of threaded fasteners. The first removable end plate includes a fuel inlet line and a thermal fluid inlet line, and the second removable end plate includes a fuel outlet line and a thermal fluid outlet line. The main body includes a plurality of interior first fluid pathways and a plurality of interior thermal fluid pathways defined therein, the interior first fluid pathways being responsible for connecting the fuel inlet line to the fuel outlet line and the interior thermal fluid pathways being responsible for connecting the thermal fluid inlet line to the thermal fluid outlet line.

17 Claims, 32 Drawing Sheets

Related U.S. Application Data which is a continuation of application No. 15/446,475, filed on Mar. 1, 2017, now Pat. No. 10,233,874.

(60) Provisional application No. 62/389,532, filed on Mar. 1, 2016, provisional application No. 62/498,929, filed on Jan. 12, 2017.

(56) References Cited

U.S. PATENT DOCUMENTS

| | | | | |
|---|---|---|---|---|
| 4,979,483 | A | * | 12/1990 | Ray ............... F02M 31/16 123/557 |
| 2008/0257315 | A1 | * | 10/2008 | Thomas ........... F02M 31/18 700/274 |
| 2014/0060502 | A1 | * | 3/2014 | De Landa Magarin ............... F02M 31/00 123/557 |

* cited by examiner

FUEL HEATING APPARATUS AND METHODS

CROSS-REFERENCES TO RELATED APPLICATIONS

This application is a continuation-in-part of U.S. patent application Ser. No. 16/357,922 filed Mar. 19, 2019, entitled FUEL HEATING APPARATUS AND METHODS, which is a continuation of and claims the benefit of and priority to U.S. patent application Ser. No. 15/446,475 filed Mar. 1, 2017 entitled FUEL HEATING APPARATUS AND METHODS now issued U.S. Pat. No. 10,233,874, which is a non-provisional of Provisional U.S. Patent Application No. 62/389,532 and is also a non-provisional of Provisional U.S. Patent Application No. 62/498,929, all of which are hereby incorporated by reference in their entireties.

BACKGROUND

The invention relates to combustion engines and more particularly to fuel heating systems for internal combustion engines.

Vehicles with internal combustion engines such as transport trucks typically include a fuel tank supplying fuel to an engine by a fuel line. One or more fuel filters are positioned along the fuel line between the fuel tank and the engine to filter debris or contaminants from the fuel before the fuel enters the engine. Fuel filters of this nature are generally removable so they can be replaced at regular service intervals or when they become clogged. When operating in cold climates, fuel, and especially diesel fuel, has a tendency to thicken and become clogged in a fuel filter. This phenomenon is referred to as gelling of the fuel.

Currently, when diesel fuel gels in cold climates it clogs up the fuel filters when the vehicle either is off, at idle, or in operation and can prevent a vehicle from starting during a cold start or can quickly shut a vehicle down. For example, if a vehicle encounters a cold front while in operation, the fuel in the fuel filter may gel and prevent proper operation of the fuel system. Similarly, if a vehicle is started in a cold start condition, gelled fuel in the fuel filter may prevent the vehicle from properly starting. There are many variables to gelling of fuel, and water and wax clogging of the filter media in cold temperatures is one effect of gelling that starves the engine of fuel. The impact of this gelling process is a costly and time consuming endeavor including towing costs, downtime, replacement filters, service costs, and contractual penalties for delays placed on the shipping company for late deliveries.

Others have attempted to overcome the problem of gelling of fuel in fuel filters on vehicles by providing heating elements on the exterior of the fuel filter. For example, others have provided external wraps that apply to the exterior of a fuel filter housing. However, such external devices are often ineffective at solving the problems of preventing gelling because they do not provide adequate heat to the interior of the fuel filter to prevent gelling. Heating devices placed on the exterior of a fuel filter lose much of the applied heat outwardly to the ambient environment.

Another problem associated with fuel heating systems in vehicles includes reduction of fuel efficiency in various operating conditions. It has been observed through research that when a vehicle engine is first started, especially during the first two to four hours of operation, the fuel economy achieved is lower than the fuel economy achieved after the fuel temperature reaches a higher level. Experimental observations also reveal that fuel temperature delivered to the engine in vehicles is generally not regulated. Additionally, the temperatures at which fuel is stored in underground tanks may vary significantly from ambient operating temperatures encountered during use. This leads to wide variance in incoming fuel temperatures delivered to the engine for combustion. It is observed that unregulated incoming fuel temperature may contribute to variance in fuel efficiency across diverse operating conditions.

What is needed, then are improvements in devices and methods for preventing gelling of fuel in fuel delivery systems, and also improvements in devices and methods for improving fuel efficiency.

BRIEF SUMMARY

The present disclosure provides an apparatus and methods for use with fuel delivery systems, and particularly for use with internal combustion engines in vehicles such as cars and trucks, and other applications such as in engines for barges, aircraft, watercraft, heavy equipment, locomotives and stationary power generation. The fuel heating apparatus includes a fuel tank, an engine, and a fuel line disposed between the fuel tank and the engine. One or more fuel filters are disposed along the fuel line. The fuel line connects to an inlet on a fuel filter head on one side, and also connects to an outlet on the fuel filter head on the other side. A removable fuel filter is securable to the fuel filter using a mechanical engagement such as a threaded connection. Fuel travelling through the fuel line from the fuel tank to the engine enters the fuel filter head, passes into the fuel filter into an uncleaned or unfiltered fuel plenum, passes across a filter medium, enters a cleaned or filtered fuel plenum inside the fuel filter, exits the fuel filter back into the fuel filter head, re-enters the fuel line and travels to the engine. As the fuel passes across the filter medium inside the fuel filter, contaminants and debris are removed from the fuel.

One aspect of the present disclosure provides a fuel heating system including a fuel filter head having a support rod extending from the fuel filter attachment location, and a heating element is disposed on the support rod. The heating element includes one or more electrical leads passing through the support rod and out the fuel filter head for attachment to an electronic control. The heating element is positioned on the support rod to reside inside the clean fuel plenum on the fuel filter when the fuel filter is installed on the fuel filter head. The heating element is operable to heat the fuel filter to prevent gelling of the fuel inside the fuel filter. The heating element may be operated while the vehicle is moving or when the vehicle is stationary.

In some embodiments, such as in diesel trucks, multiple fuel filters are positioned in parallel or in series on a fuel line, and each fuel filter head includes a separate support rod and heating element positioned to reside inside the fuel filter when the fuel filter is installed on the fuel filter head to provide controlled heating to prevent gelling of fuel in each fuel filter.

In additional embodiments, the present disclosure provides a fuel heating system including a fuel filter having a filter medium disposed on the interior of the fuel filter. The filter medium includes a metal screen. First and second electrical leads are attached to the metal screen, and the metal screen is operable as a resistance heating element on the interior of the fuel filter when current is passed through the first and second electrical leads across the metal screen. Thus, the fuel filter includes an integral heating element.

Heat from the heating element warms the interior of the fuel filter and prevents gelling of the fuel in cold environments.

In additional embodiments, the present disclosure provides a fuel heating system including a temperature feedback control loop including a fuel filter head having a heating element extending from the fuel filter head such that the heating element resides on the interior of a fuel filter in the clean fuel plenum during use. The heating element includes at least one electrical lead passing out of the fuel filter head to an electronic circuit. A first temperature sensor such as a thermocouple is positioned on the fuel filter head, or alternatively on the heating element, or alternatively on a supporting structure between the fuel filter head and heating element. The first temperature sensor provides a measurement of the local temperature to a thermostat or temperature controller during use. A control switch allows a user to select a desired temperature for measurement by the first temperature sensor or to turn the unit on and off. The thermostat controls the flow of current to and operation of the heating element to provide a measured temperature in the desired range or at the desired value.

In some embodiments, a first temperature sensor such as a thermocouple is positioned to monitor temperature at the fuel inlet of the fuel filter head, and a second temperature sensor such as a thermocouple is positioned to monitor temperature at the fuel outlet of the fuel filter head. Each temperature sensor is connected to a thermostat or controller connected to the heating element to adjust the heating element operation until a desired measured temperature is reached.

Another aspect of the present disclosure provides a controlled fuel temperature apparatus and associated methods to regulate the temperature of fuel delivered to the engine for combustion. The controlled fuel temperature apparatus includes a fuel tank, an engine, and a fuel line disposed between the fuel tank and the engine. A fuel temperature regulator is positioned between the fuel tank and the engine to control the fuel temperature en route to the engine for combustion. The fuel temperature regulator includes a working thermal fluid passed through a heat exchanger in thermal contact with the fuel. The fuel being delivered to the engine passes through a heat exchanger through which the working thermal fluid also passes. Thermal energy is transferred between the working thermal fluid and the fuel to regulate the temperature of the fuel in a desired range or at a desired value. The temperature-regulated fuel exits the fuel temperature regulator and enters the engine downstream of the fuel temperature regulator.

In some embodiments, the fuel temperature regulator, or controlled fuel temperature module, is installed on a vehicle at a location accessible by a user. A bypass valve and bypass line may be disposed on fuel line around the device to allow a user to selectively engage or disengage the fuel temperature regulator. Additionally, a bypass valve and a bypass line are installed on the heat exchanger in some embodiments to selectively block the flow of the working thermal fluid through the heat exchanger at a user's discretion.

In further embodiments, the present disclosure provides a fuel heating apparatus including a fuel filter heater and a controlled fuel temperature module. The apparatus includes a combined unit including a fuel filter head having a heating element extending from the fuel filter head positioned to reside on the interior of a fuel filter in the clean fuel plenum. The combined unit of the apparatus also includes a heat exchanger through which the fuel is passed during flow of fuel through the fuel line. A working thermal fluid is also passed through the heat exchanger such that the temperature of the fuel travelling through the fuel line is regulated by the heat exchanger. The heating element inside the fuel filter also prevents gelling of the fuel.

In further embodiments, the present disclosure provides a method for reducing pollutant emissions from an internal combustion engine, including the steps of: (a) providing a system including a fuel tank, an engine, and a fuel line disposed between the fuel tank and the engine; (b) providing a heat exchanger on the fuel line between the fuel tank and the engine; (c) passing fuel from the fuel line through the heat exchanger; and (d) simultaneously passing working thermal fluid through the heat exchanger such that the working thermal fluid transfers heat to the fuel in the heat exchanger prior to delivery of the fuel to the engine for combustion.

In further embodiments, the present disclosure provides a method for increasing fuel efficiency from an internal combustion engine, including the steps of: (a) providing a system including a fuel tank, an engine, and a fuel line disposed between the fuel tank and the engine; (b) providing a heat exchanger on the fuel line between the fuel tank and the engine; (c) passing fuel from the fuel line through the heat exchanger; and (d) simultaneously passing working thermal fluid through the heat exchanger such that the working thermal fluid transfers heat to the fuel in the heat exchanger prior to delivery of the fuel to the engine for combustion.

In further embodiments, the present disclosure provides for a fuel heating apparatus including a heat exchanger body having a first removable end plate, a main body, and a second removable end plate opposite the first removable end plate. The first and second removable end plates are secured to opposing sides of the heat exchanger main body by a plurality of threaded fasteners. In such embodiments, the first removable end plate includes a first fluid inlet opening and a second fluid inlet opening, and the second removable end plate includes a first fluid outlet opening and a second fluid outlet opening. Further, the main body has an interior first fluid pathway and a number of second fluid pathways defined therein. In some embodiments, the interior first fluid pathway is responsible for carrying a thermal fluid between the first fluid inlet opening and the first fluid outlet opening, while the number of second fluid pathways are responsible for carrying fuel between the second fluid inlet opening to the second fluid outlet opening. In some embodiments, the first fluid is thermal fluid, while the second fluid is fuel; in other embodiments, the first fluid is fuel, while the second fluid is thermal fluid.

A further objective of the present disclosure is to provide a fuel heating apparatus capable of improving fuel efficiency during operation of a combustion system by utilizing a heat exchanger to pre-heat fuel prior to delivery to the engine for combustion and also capable of preventing gelling of fuel in the fuel filter by heating the fuel filter.

Numerous other objects, features and advantages of the present invention will be readily apparent to those skilled in the art upon a reading of the following disclosure when taken in conjunction with the accompanying drawings

DETAILED DESCRIPTION

Figure 1:
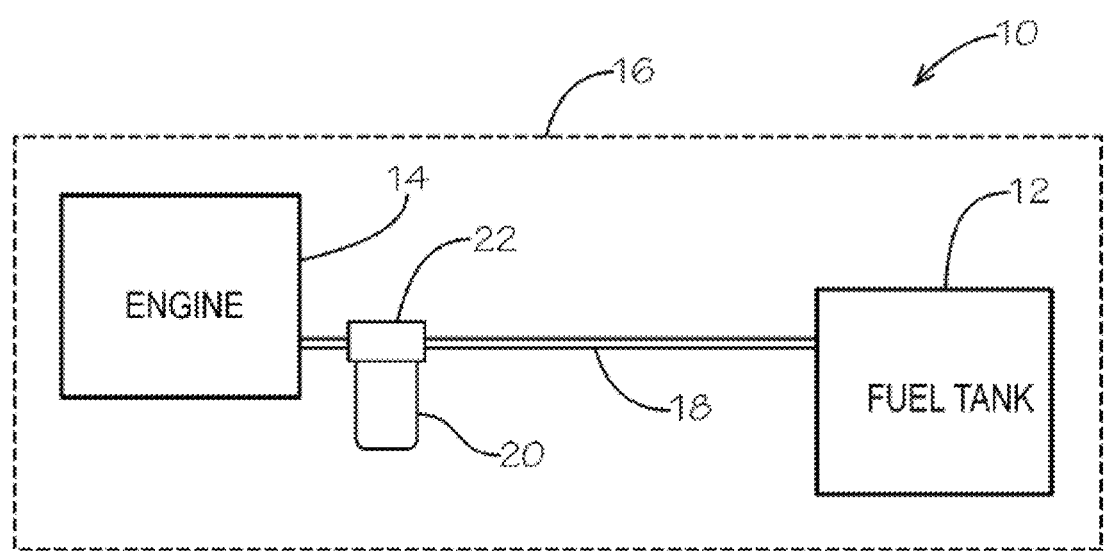
FIG. 1 illustrates a schematic view of an embodiment of a fuel heating apparatus in accordance with the present disclosure.

Referring now to the drawings, various views of embodiments of an arm positioner, or arm stabilizer device, and components therefor are illustrated. In the drawings, not all reference numbers are included in each drawing, for the sake of clarity. In addition, positional terms such as "upper," "lower," "side," "top," "bottom," "vertical," "horizontal" etc. refer to the apparatus when in the orientation shown in the drawings or similar orientations. A person of skill in the art will recognize that the apparatus can assume different orientations when in use.

An embodiment of a fuel heating apparatus 100 is shown in FIG. 1. The fuel heating apparatus 10 includes a fuel tank 12 and an engine 14. The fuel heating apparatus 10 may be positioned on a vehicle 16 in some embodiments. A fuel line 18 is positioned between the fuel tank 12 and the engine 14. Fuel line 18 provides a conduit for the flow of fuel from the fuel tank 12 to the engine 14. A fuel filter 20 is included on fuel line 18 to prevent debris or contaminants in the fuel from entering the engine 14. A fuel filter head 22 may be fixed on the vehicle 16, and the fuel filter 20 may be removably attached to the fuel filter head 22. Fuel filter 20 may be unscrewed from fuel filter head 22 and replaced at regular service intervals or when fuel filter 20 becomes clogged. Fuel filter 20 includes a screw-on canister-style fuel filter in some embodiments.

Figure 2:
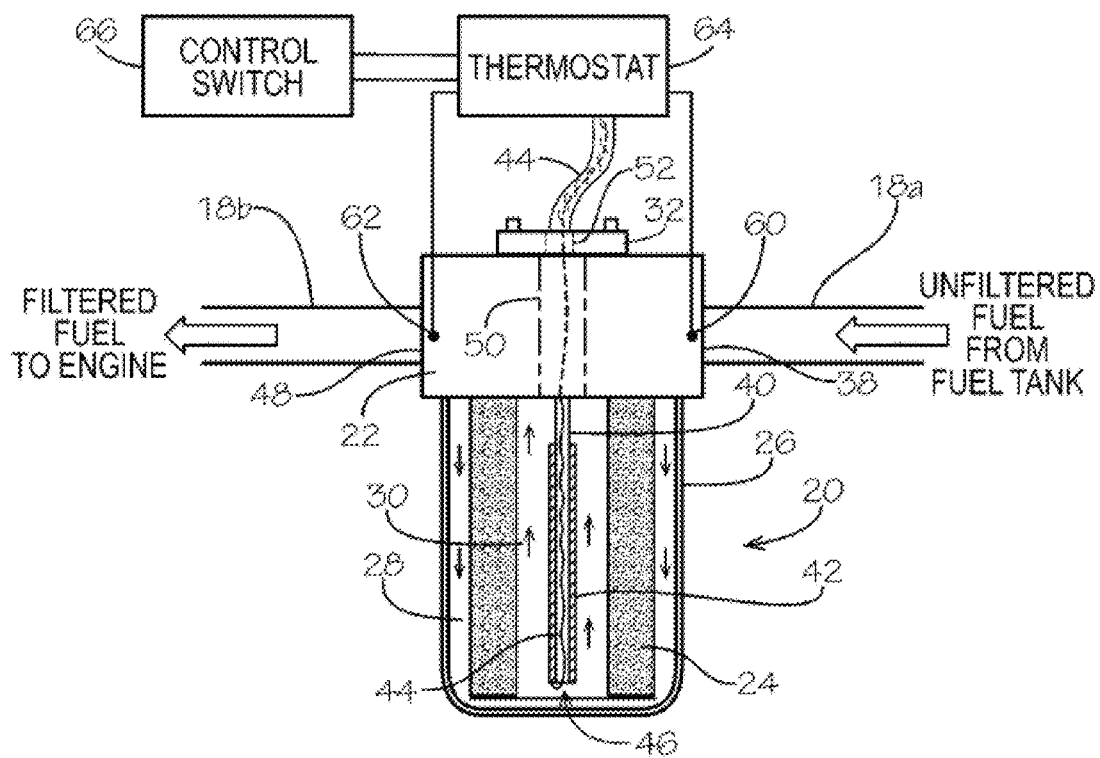
FIG. 2 illustrates a cross-sectional view of an embodiment of a fuel heating apparatus in accordance with the present disclosure.

The present disclosure provides a modified fuel filter assembly in some embodiments, as seen for example in FIG. 2. Fuel filter head 22 includes a fuel inlet 38 and a fuel outlet 48. A fuel filter 20 is installed on fuel filter head 22. Fuel filter 20 includes a filter housing 20 surrounding a fuel filter media 24 such as a fabric, paper or other porous filter material. Fuel travels into the fuel filter assembly from the incoming fuel line 18a, through fuel inlet 38, and into an unfiltered fuel plenum 28 on the radial exterior of the fuel filter media 24. The fuel then passes through the fuel filter media 24 and into a filtered fuel plenum 30 radially interior to the fuel filter media 24. The fuel then passes upwardly through the filtered fuel plenum 30 and out the fuel outlet 48 into the outgoing fuel line 18b toward the engine.

A support rod 40 extends downwardly from fuel filter head 22 in a position to be received inside the fuel filter 20 when the fuel filter 20 is installed on fuel filter head 22. In some embodiments, support rod 40 is housed inside the filtered fuel plenum 30 when fuel filter 20 is installed on fuel filter head 22. Support rod 40 includes a hollow interior passage 46 in some embodiments. A heating element 42 is disposed on support rod 40 such that heating element 42 is housed on the interior of fuel filter 20 in the filtered fuel plenum 30 during use. Heating element 42 includes any suitable device for generating heat on the interior of the fuel filter 20, and may include a resistance heating element. One or more heating element electrical leads 44 extend from heating element 42 for attachment to an electronic control such as a thermostat 64. In some embodiments, heating element lead 44 passes through hollow interior passage 46 on support rod 40 and out of the upper end of fuel filter head 22. Heating element lead 44 may then be connected to a thermostat 64.

A cover plate 32 is installed on the upper side of fuel filter head 32 in some embodiments. A central bore 50 is defined through the fuel filter head 22 from the upper side of the fuel filter head 22 downwardly through the fuel filter head 22. The central bore 50 allows passage of the support rod 40 together with the heating element 42 when fuel filter 20 is installed onto the fuel filter head 22. Cover plate 32 provides a cap blocking the opening of central bore 50 on the upper side of the fuel filter head 22. Cover plate 32 may be secured to the upper side of fuel filter head 32 using one or more cover plate fasteners 34, shown in FIG. 5.

A cover plate passage 52 is defined through the cover plate co-axially aligned with the central bore 50. Heating element lead 44 exits the cover plate 32 through the cover plate passage 52. An annular cover seal 54 is disposed between the cover plate 32 and the upper side of the fuel filter head 22 in some embodiments to prevent fuel from leaking from the interface between the cover plate 32 and the fuel filter head 22. An additional seal may be positioned around heating element lead 44 in cover plate passage 52 or the passage 46 in support rod 40 to prevent further leakage of fuel from the apparatus.

During use, a first temperature sensor 60 is positioned at the fuel inlet 38, and a second temperature sensor 62 is positioned at the fuel outlet 48 in some embodiments. The first and second temperature sensors each include a thermocouple in some embodiments. Each temperature sensor provides a temperature measurement to a thermostat 64 in some embodiments. The thermostat is operable to control the flow of electric current to the heating element 42 to regulate the temperature. A setpoint temperature may be selected on the thermostat, and the measured temperature from the first or second temperature sensor provides a reference temperature. A control switch 66 may be placed remote from the fuel filter 20, for example in the cab of a vehicle, to allow a user to control operation of the device, including the thermostat, and to turn the heating device on or off. For example, in some applications, the apparatus is operable to regulate the temperature inside the fuel filter at or above negative thirty degrees Fahrenheit to prevent gelling of the fuel inside the filter. In further applications, the apparatus is operable to regulate the temperature inside the fuel filter at or above zero degrees Fahrenheit to prevent gelling of the fuel inside the filter. In further embodiments, the apparatus is configured to automatically activate the heating element if the measured temperature inside the fuel filter drops below a setpoint, for example thirty-five degrees Fahrenheit. If the measured temperature drops below the setpoint, the heating element will begin heating the interior of the fuel filter until the measured temperature is back above the predetermined setpoint value.

Figure 3:
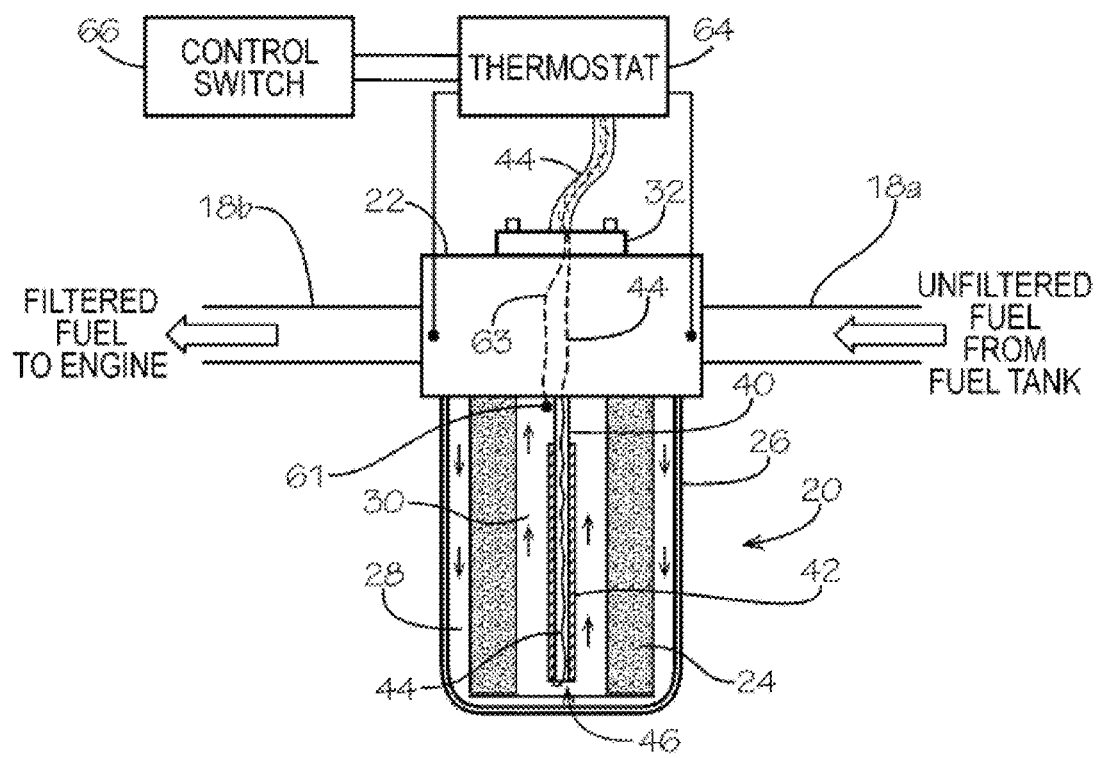
FIG. 3 illustrates a schematic view of an embodiment of a fuel heating apparatus in accordance with the present disclosure.

As seen in FIG. 3, in some embodiments, it is desirable for a user to know the measured temperature inside the fuel filter 20. In such embodiments, an interior temperature sensor 61 is positioned to be housed inside the fuel filter 20 when the fuel filter 20 is installed on the fuel filter head 22. Interior temperature sensor 61 includes a thermocouple in some embodiments. Interior temperature sensor 61 may be attached to the support rod 40, attached to the heating element 42, or generally positioned to reside on the interior of the fuel filter 20 extending downwardly from the fuel filter head 22, as shown in FIG. 3. An interior temperature sensor lead 63 provides a signal from the interior temperature sensor 61 to an electronic circuit outside the fuel filter 20. For example, interior temperature sensor lead 63 in some embodiments passes through the central bore in the fuel filter head 22 and out the cover plate 32 to a thermostat 64. The measured temperature inside the fuel filter 20 is provided to the thermostat 64 via the interior temperature sensor lead 63. The measured temperature inside fuel filter 20 may be used to control operation of heating element 42. For example, when the measured temperature from interior temperature sensor 63 is below a setpoint temperature, the thermostat 62 is operable to send current to heating element 42 until the measured interior temperature is equal to or within an acceptable range of the setpoint temperature.

Figure 4:
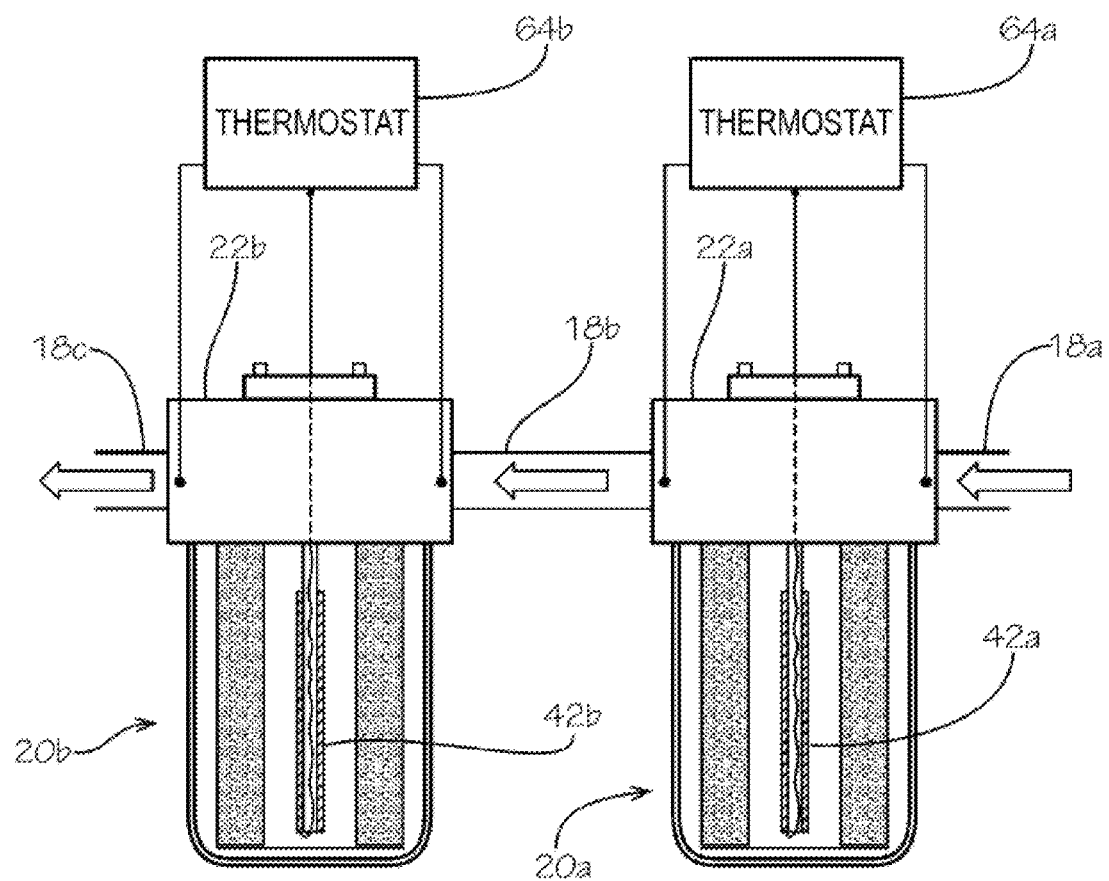
FIG. 4 illustrates a schematic view of an embodiment of a fuel heating apparatus in accordance with the present disclosure.

The fuel heating apparatus of the present disclosure may be used in combination with multiple fuel filters along a fuel line in series or in parallel. For example, as seen in FIG. 4, a fuel line includes an incoming fuel line 18a supplying fuel to a first fuel filter head 22a. A first fuel filter 20a is installed on first fuel filter head 22a. A first heating element 42a is disposed on the interior of first fuel filter 20a, and a second heating element 42b is disposed on the interior of second fuel filter 20b. First heating element 42a is connected to a first thermostat 64a, and second heating element 42b is connected to a second thermostat 64b. First and second thermostats 64a, 64b may be controlled together or separately to achieve desired heating inside each fuel filter 20a, 20b.

Figure 5:
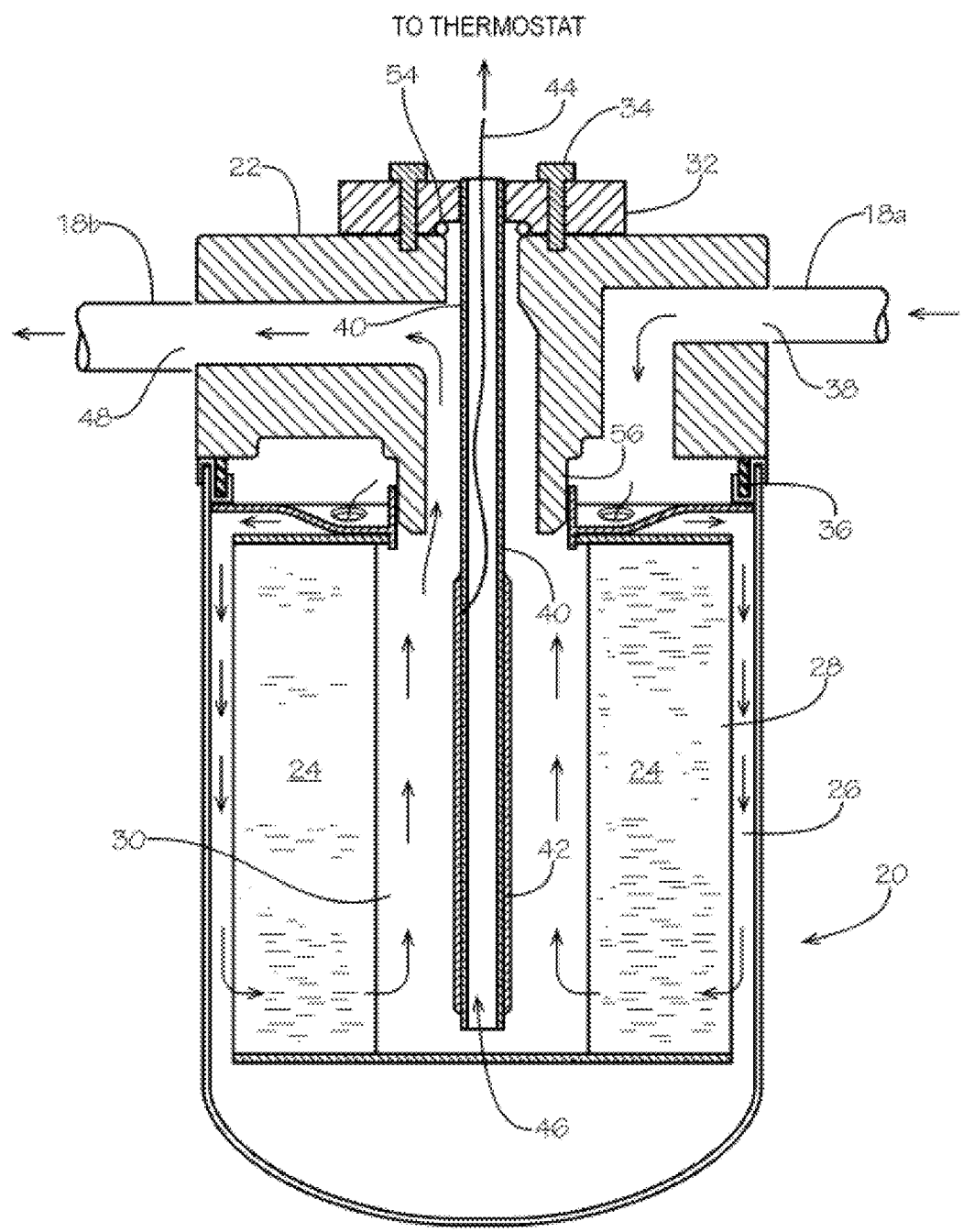
FIG. 5 illustrates a schematic view of an embodiment of a fuel heating apparatus in accordance with the present disclosure.

Referring to FIG. 5, an embodiment of a fuel heating apparatus includes a fuel filter head 22 and a fuel filter 20 attached to the fuel filter head. A threaded filter mount 56 is disposed on the fuel filter head 22, and fuel filter 20 includes a threaded filter socket that screws onto the threaded filter mount 56 in some embodiments. An annular filter seal 36 is positioned around the upper rim of the fuel filter between the fuel filter housing 26 and the fuel filter head 22. Fuel flows from the incoming fuel line 18a into the fuel inlet 38 and passes through a channel in the fuel filter head 22 into the intake on the fuel filter 20. Fuel passes into the fuel filter 20 and enters an unfiltered fuel plenum 28 between filter housing 26 and filter media 24. Fuel then travels through filter media 24 into a filtered fuel plenum 30 on the interior of the fuel filter 20. Filtered fuel travels upwardly through a channel in the fuel filter head and out the fuel outlet 48 on fuel filter head 22.

Heating element 42 is positioned inside filtered fuel plenum 30 to provide heat to the interior of fuel filter 20 to prevent gelling of the fuel inside the fuel filter during transport or during idle, or at rest. A heating element lead 44 passes through the interior passage 46 in support rod 40 in some embodiments. Heating element lead 44 passes out of the fuel filter head through a cover plate passage in cover plate 32 and is connected to an electronic circuit to regulate the temperature inside the fuel filter 20.

Figure 6:
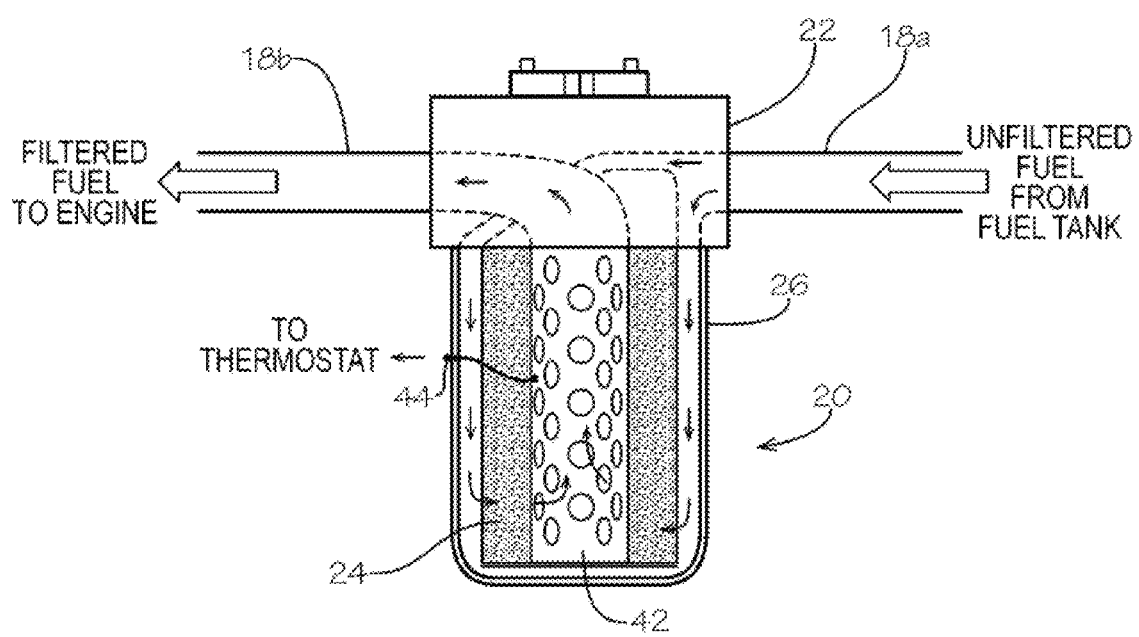
FIG. 6 illustrates a schematic view of an embodiment of a fuel heating apparatus in accordance with the present disclosure.

In some embodiments, it is desirable to provide a fuel heating apparatus having a heating device for use with a conventional fuel filter head. Referring to FIG. 6, in some embodiments the present disclosure provides a modified fuel filter 20 having a fuel filter housing 26 surrounding a fuel filter medium 24 and an inner metal screen forming a heating element 42. Metal screen heating element 42 provides a porous structure supporting fuel filter medium 24 and defining a filtered fuel plenum on the interior of the metal screen heating element 42. Metal screen heating element 42 includes one or more holes to allow passage of filtered fuel into the filtered fuel plenum. In some embodiments, the metal screen heating element 42 forms a resistance heating element operable to heat the interior of fuel filter 20 when current is passed through the metal screen heating element 42. Metal screen heating element 42 includes a heating element lead 44 extending through the fuel filter to an exterior electrical terminal. A connector wire may be attached to the exterior electrical terminal on the exterior of fuel filter housing 26 to connect the heating element lead 44 to a thermostat for controlling the operation of the metal screen heating element 42. One or more temperature sensors, such as a thermocouple, may be positioned inside the fuel filter and connected to an exterior terminal to provide measurement of the temperature inside the fuel filter for controlling the thermostat.

Figure 7:
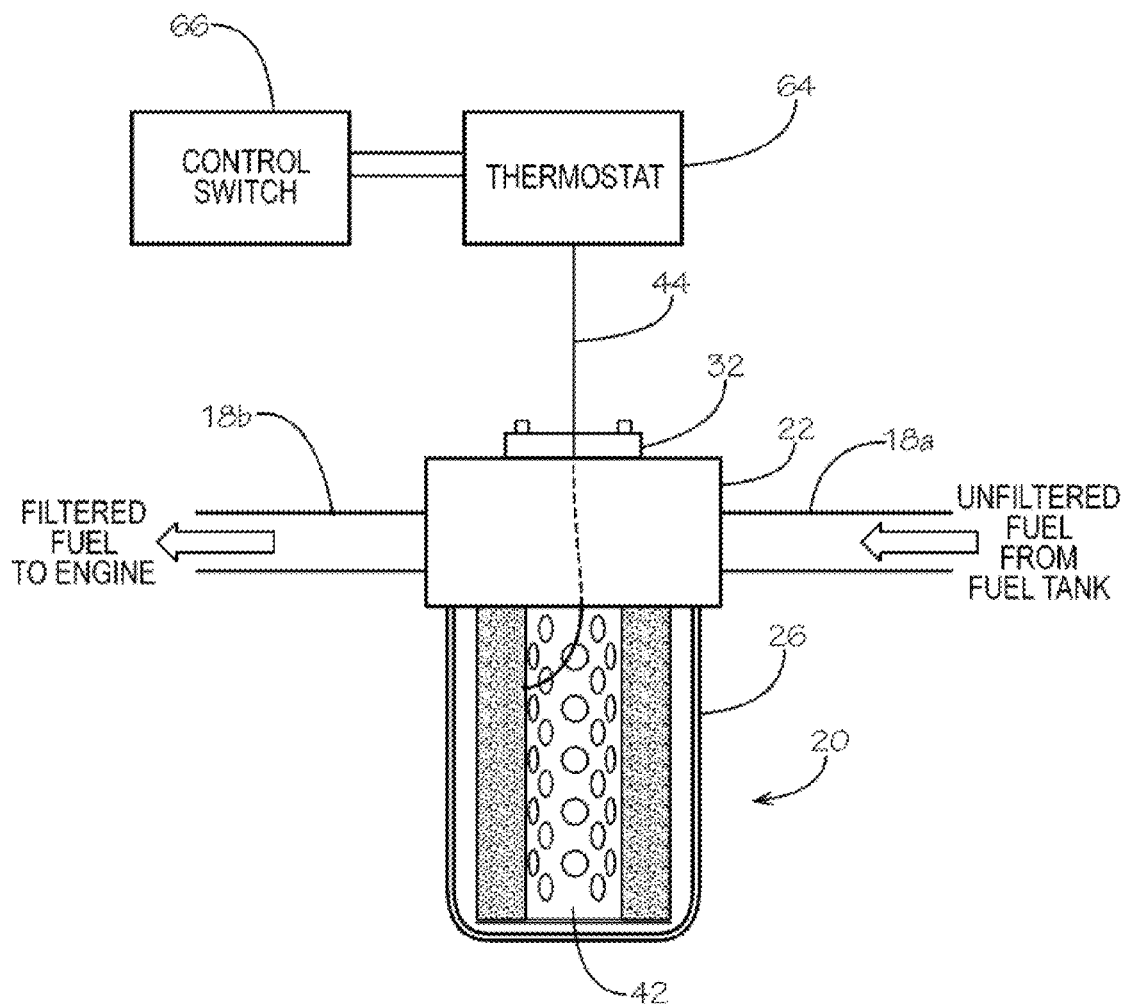
FIG. 7 illustrates a schematic view of an embodiment of a fuel heating apparatus in accordance with the present disclosure.

As seen in FIG. 7 in an alternative embodiment, metal screen heating element 42 includes a heating element lead 44 passing through the central bore in the fuel filter head 22 to a thermostat 64.

In further embodiments, the present disclosure provides an apparatus to not only prevent gelling of fuel, but to also improve fuel efficiency by pre-heating fuel prior to delivery of the fuel to the engine for combustion. It has been observed through experiments that fuel entering the combustion chamber of an engine in conventional fuel delivery systems varies widely depending on numerous variables. By pre-heating the fuel prior to delivery to the engine, gains in fuel efficiency may be achieved. For example, in certain experiments, it was observed that an increase of approximately forty degrees in fuel temperature to between 75 degrees F. and 115 degrees F. resulted in an increase in fuel efficiency from 5.0 miles per gallon to 6.2 miles per gallon, which when normalized for variation in air density constitutes about a fifteen percent increase in miles per gallon efficiency. Additional experimental results further corroborate these findings.

Figure 8:
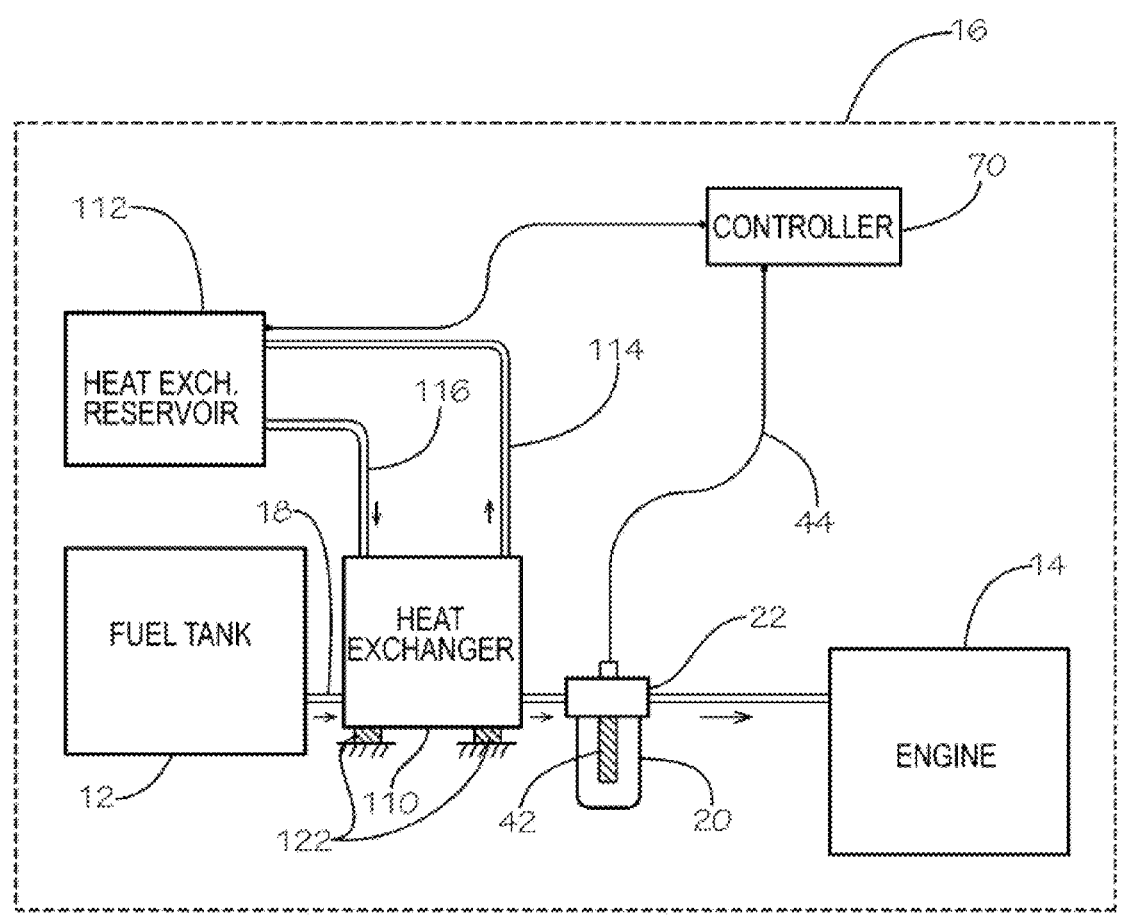
FIG. 8 illustrates a schematic view of an embodiment of a fuel heating apparatus in accordance with the present disclosure.

The present disclosure provides a fuel heating system including a controlled fuel temperature apparatus and associated methods to regulate the temperature of fuel delivered to the engine for combustion. As shown in FIG. 8, an embodiment of the controlled fuel temperature apparatus includes a fuel tank 12, an engine 14, and a fuel line 18 disposed between the fuel tank and the engine. A fuel temperature regulator is positioned between the fuel tank and the engine to control the fuel temperature en route to the engine for combustion. The fuel temperature regulator includes a working thermal fluid passed through a heat exchanger 110 in thermal contact with the fuel. The fuel being delivered to the engine passes through a heat exchanger 110 through which a working thermal fluid also passes. The working thermal fluid enters the heat exchanger through a heat exchanger inlet 116 and exits the heat exchanger through a heat exchanger outlet 114. The working thermal fluid is contained in a remote heat exchanger reservoir 112.

Thermal energy is transferred between the working thermal fluid and the fuel upstream of the engine to regulate the temperature of the fuel in a desired range or at a desired setpoint value. The temperature-regulated fuel exits the heat exchanger 110 of the fuel temperature regulator and continues downstream toward the engine. The temperature-regulated fuel may travel through a downstream fuel filter 20 in some embodiments. Fuel filter 20 includes a heating element 42 in some embodiments to further prevent gelling of fuel during startup, during idle, or during non-use in cold environments. A controller 70 is coupled to the controlled temperature regulator to control the flow and temperature of working thermal fluid in the heat exchanger 110. Controller 70 in some embodiments is connected to a pump or a flow controller along heat exchanger inlet 116 or heat exchanger outlet 114 to regulate the flow rate and/or temperature of the working thermal fluid passing through the heat exchanger fluid circuit.

As seen in FIG. 8, in some embodiments, heat exchanger 110 includes a conventional flow-type heat exchanger including a fluid circuit for passage of the working thermal fluid and a separate fluid circuit for passage of the fuel to be heated. The working thermal fluid and the fuel to be heated do not come into direct contact in the heat exchanger, but instead are in thermal contact via the heat exchanger structure. One or more vibration isolation mounts 122 are installed between the heat exchanger 110 and the vehicle to reduce the effects of vibration on the complex heat exchanger geometry during extended use.

Figure 9:
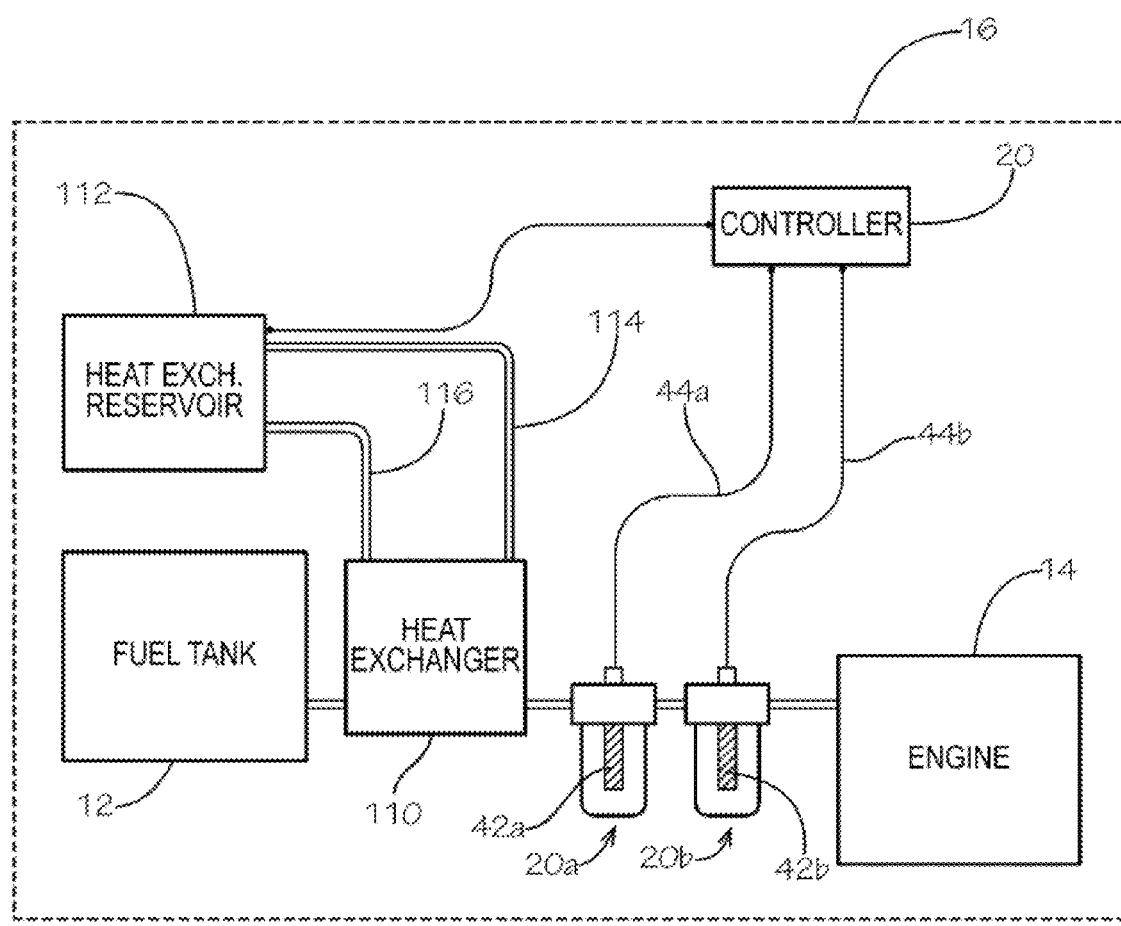
FIG. 9 illustrates a schematic view of an embodiment of a fuel heating apparatus in accordance with the present disclosure.

As seen in FIG. 8 and FIG. 9, in further embodiments, the present disclosure provides a fuel heating apparatus including a fuel filter heater and a controlled fuel temperature module. The apparatus includes a combined unit including a fuel filter head 22 having a heating element 42 extending from the fuel filter head positioned to reside on the interior of a fuel filter 20 in the filtered fuel plenum. The combined unit of the apparatus also includes a heat exchanger 110 through which the fuel is passed during flow of fuel through the fuel line 18. A working thermal fluid is also passed through the heat exchanger 110 such that the temperature of the fuel travelling through the fuel line is regulated by the heat exchanger 110. The heating element inside the fuel filter 20 also prevents gelling of the fuel.

As shown in FIG. 9, the combined controlled fuel temperature module includes first and second fuel filters 20a, 20b each including its own heating element 42a, 42b positioned downstream of a heat exchanger 110 which pre-heats the fuel prior to delivery into the first and second fuel filters 20a, 20b. The heated fuel passes through the first and second fuel filters 20a, 20b and enters the engine for combustion. In some embodiments, first and second heating elements 42a, 42b are independently controlled by controller 20 via first heating element lead 44a and second heating element lead 44b.

In some embodiments, the fuel temperature regulator, or controlled fuel temperature module, is installed on a vehicle at a location accessible by a user. One or more bypass lines may be disposed on the module to allow a user to selectively engage or disengage the fuel temperature regulator. Additionally, a bypass valve and a bypass line are installed on the heat exchanger in some embodiments to selectively block the flow of the working thermal fluid through the heat exchanger at a user's discretion.

Figure 10:
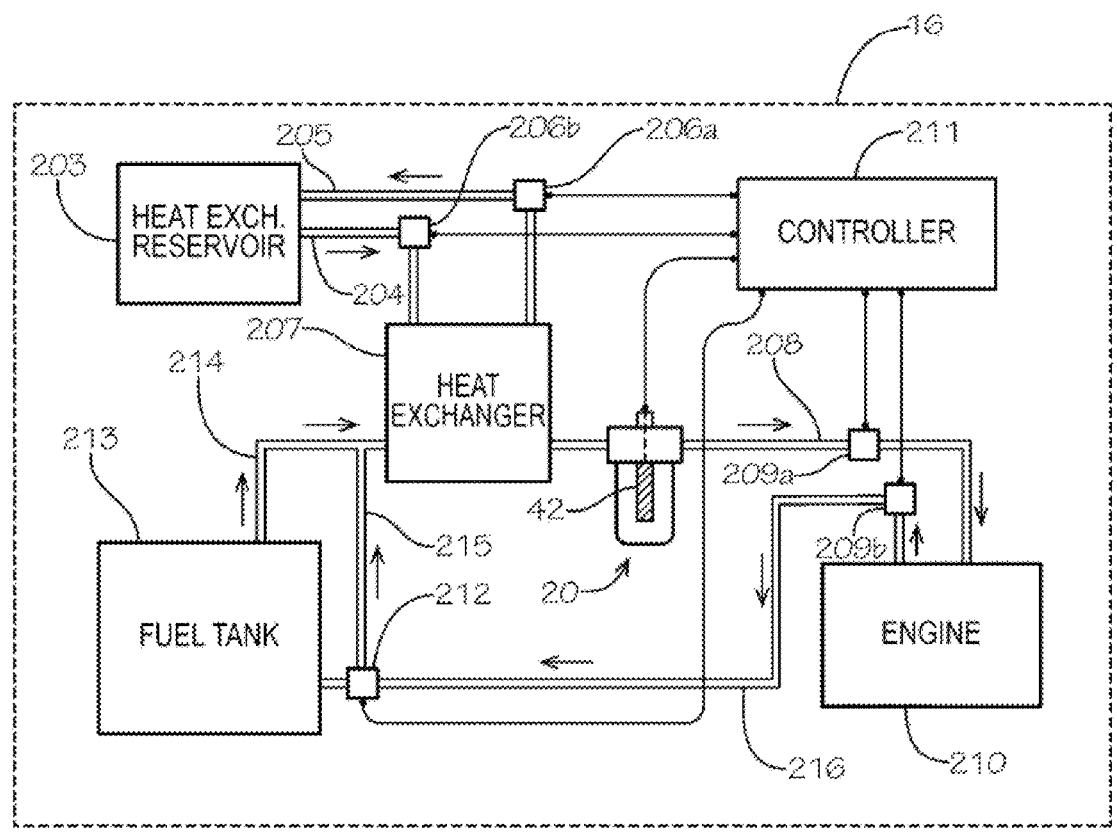
FIG. 10 illustrates a schematic view of an embodiment of a fuel heating apparatus in accordance with the present disclosure.

As shown in an example in FIG. 10, a fuel heating apparatus includes a fuel temperature regulator including a fuel tank 213 and an unheated fuel inlet line 214 exiting the fuel tank. The fuel from the fuel tank enters a heat exchanger 207. The heat exchanger 207 includes a fluid circuit containing a working thermal fluid to provide heat to the fuel. The working thermal fluid enters the heat exchanger 207 via a thermal fluid inlet line 204, or hot supply. The working thermal fluid exits the heat exchanger and returns to a thermal fluid reservoir 203 via a thermal fluid outlet line 205. Thermal fluid reservoir 203 may include any thermal fluid source in a vehicle, such as engine coolant, exhaust gas, heated liquid oil from the engine, or heated fluid from the transmission. The working thermal fluid may be directly or indirectly heated from any of the above-listed heat sources. In some embodiments, a separate heat source such as a resistance heating element is provided in thermal fluid reservoir 203 to provide desired heat to the working thermal fluid.

A first flow controller 206a is positioned on the thermal fluid outlet line 205, and a second flow controller 206b is positioned on the thermal fluid inlet line 204 in some embodiments. Each flow controller 206a, 206b is electrically connected to a controller 211. Controller 211 is operable to control the flow of working thermal fluid to and/or from the heat exchanger 207 to provide desired heat transfer to the fuel passing through the heat exchanger 207.

In some embodiments, a first temperature sensor 209a is positioned downstream of the heat exchanger 110 on the heated fuel outlet line 208. The first temperature sensor 209a includes a thermocouple in some embodiments. The first temperature sensor 209a is connected to controller 211 to provide a measured fuel temperature downstream of heat exchanger 207. If the measured fuel temperature at first temperature sensor 209a is not within a desired range or at a desired setpoint temperature, the controller may command the first and/or second flow controller 206a, 206b to adjust the flow between thermal fluid reservoir 203 and heat exchanger 207.

As shown in FIG. 10, the apparatus also includes a fuel return line 216 extending between the engine 201 and fuel tank 213. This type of fuel return line 216 is common in diesel engines. A bypass valve 212 is positioned on the fuel return line 216 upstream of the fuel tank 213. Bypass valve 212 is connected to controller 211. Upon a user's instruction or a programmed algorithm, controller 211 may operate bypass valve 212 to selectively re-direct fuel travelling through return fuel line 216 along bypass line 215 around fuel tank 213 and back into the unheated fuel inlet line 214 upstream of heat exchanger 207. This bypass is desirable during the initial startup and initial operation of a vehicle from a cold start. The fuel travelling through the return fuel line 216 is generally closer to the engine temperature than the fuel tank temperature. Thus, by bypassing the fuel tank using bypass valve 212, incoming fuel delivered to the heat exchanger may be pre-heated via passage through the engine and engine return line 216 prior to entry into the heat exchanger 207.

A second temperature sensor 209b is disposed on the fuel return line 216 downstream of the engine 210. Second temperature sensor 209b is connected to the controller so that the temperature of fuel in the fuel return line 216 downstream of the engine may be measured. Depending on the measured temperature in the fuel return line 216 downstream of the engine, a user or a programmed algorithm in the controller may selectively choose to operate bypass valve 212 to an open or closed position.

Referring further to FIG. 10, a fuel filter 20 is positioned between the heat exchanger 207 and the engine 210. Fuel filter 20 includes a heating element 42 to heat the interior of fuel filter 20 to prevent gelling. Heating element 42 is connected to controller 211. One or more temperature sensors are disposed in heating filter 20 to provide temperature measurement to controller 211 in some embodiments. Controller 211 operable to monitor the temperature inside fuel filter 20 and to adjust the current supplied to heating element 42 to maintain a desired temperature inside fuel filter 20 during use, during idle, or during periods of rest of vehicle 16.

Figure 11:
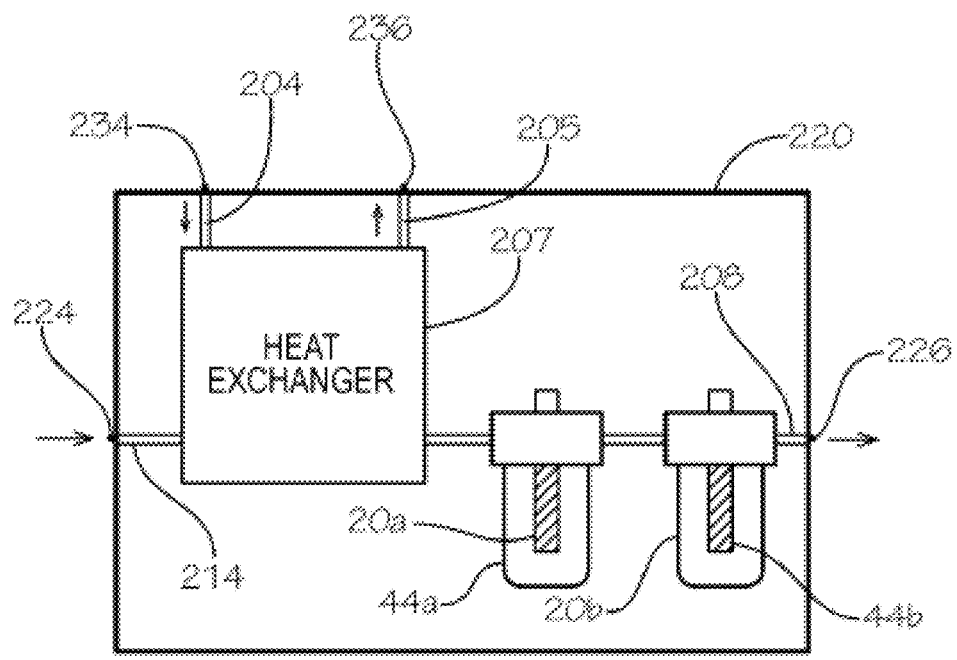
FIG. 11 illustrates a schematic view of an embodiment of a fuel heating apparatus in accordance with the present disclosure.

Referring now to FIG. 11, in some embodiments fuel heating apparatus 220 includes a module that may be installed as a discrete unit along a fuel line in a vehicle. Fuel heating apparatus 220 includes a heat exchanger 207, a thermal fluid inlet line 204 and the thermal fluid outlet line 205. A thermal fluid supply coupling 236 is connectable to a hose or other supply line fitting for supplying a working thermal fluid to heat exchanger 207. Similarly, a thermal fluid return coupling 234 is connectable to a hose or other return line fitting for returning a working thermal fluid to a heat exchanger fluid source or heat exchanger reservoir (such as a radiator, oil reservoir, thermal bath, etc.). An unheated fuel supply coupling 224 is connectable to a fuel line for passing fuel into the unheated fuel inlet line 214 upstream of heat exchanger 207. A heated fuel return coupling 226 is positioned downstream of heat exchanger 207 for connecting the heated fuel outlet line 208 to a fuel line segment to deliver fuel to an engine. One or more fuel filters 20a, 20b are positioned between heat exchanger 207 and the heated fuel return coupling 226 on the module. First fuel filter 20a includes a first heating element 44a, and second fuel filter 20b includes a second heating element 44b. Each heating element include one or more leads for connecting the heating element to an electrical circuit for controlling the operation of the heating element. Additionally, one or more temperature sensors are located in each fuel filter to provide measurement of the temperature in each fuel filter to remote controller. Notably, in some applications, the increase of temperature of fuel passing through the heat exchanger may be limited by the temperature of the working thermal fluid and the heat exchanger efficiency. For example, if the working thermal fluid passing through the heat exchanger is engine coolant, the incoming working thermal fluid temperature would be substantially equal to the engine coolant temperature, or about 190 to 210 degrees F. in some applications. This means the upper limit of the heated fuel temperature would be in a similar range, if not slightly lower due to thermal losses in the heat exchanger in such embodiments. Similarly, if the incoming working thermal fluid is from the engine oil reservoir, then the upper limit on the heated fuel temperature would be in the same range as the engine oil reservoir temperature or slightly lower due to thermal losses in the system. Additionally, in some embodiments, the heating elements in first and second fuel filters may also provide additional heat to the fuel passing through the fuel line, and may be operable to increase fuel temperature by about an additional five to fifteen degrees F. in some applications.

Figure 12:
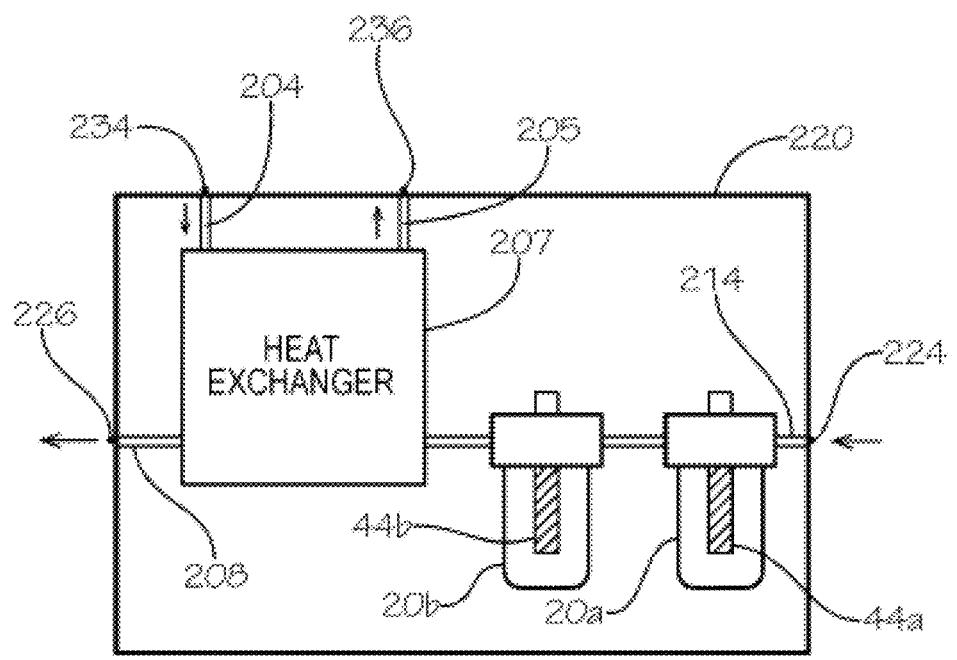
FIG. 12 illustrates a schematic view of an embodiment of a fuel heating apparatus in accordance with the present disclosure.

Referring to FIG. 12, in some embodiments, the flow direction of fuel travelling through the apparatus 200 may be reversed such that the fuel enters the fuel filters 20a, 20b upstream of heat exchanger 207.

Figure 13:
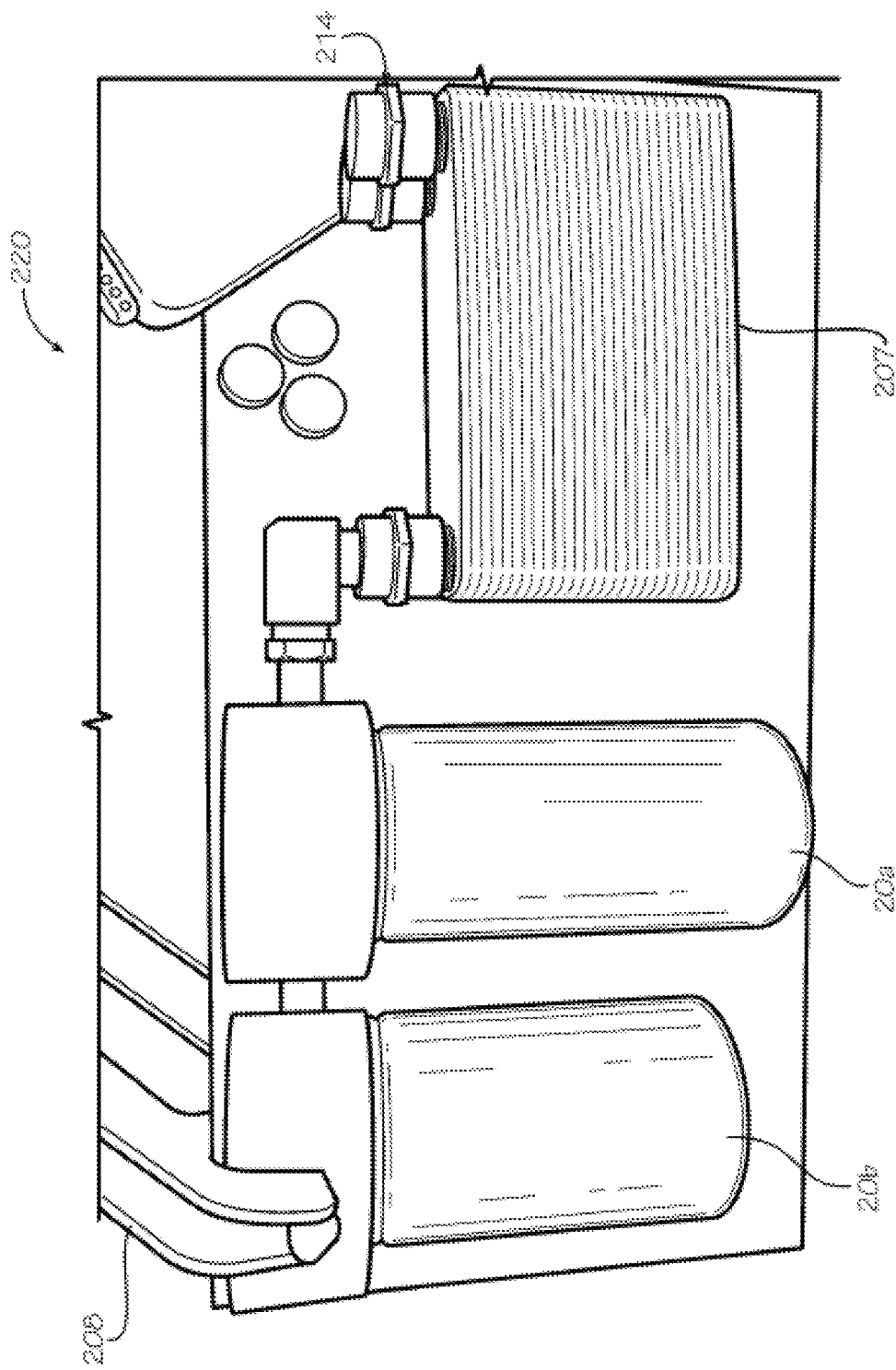
FIG. 13 illustrates a schematic view of an embodiment of a fuel heating apparatus in accordance with the present disclosure.

Referring to FIG. 13, an embodiment of a fuel heating apparatus 220 includes a heat exchanger 207, a first fuel filter 20a downstream of the heat exchanger 207, and a second fuel filter 20b in series with the first fuel filter 20a and heat exchanger 207 downstream of the heat exchanger 207. The heated fuel outlet line 208 exits the second fuel filter 20b and sends heated, filtered fuel to the engine for combustion. The unheated fuel inlet line 214 enters the heat exchanger 207. A working thermal fluid at a desired temperature passes through heat exchanger 207 to heat the fuel travelling through heat exchanger 207.

Figure 14:
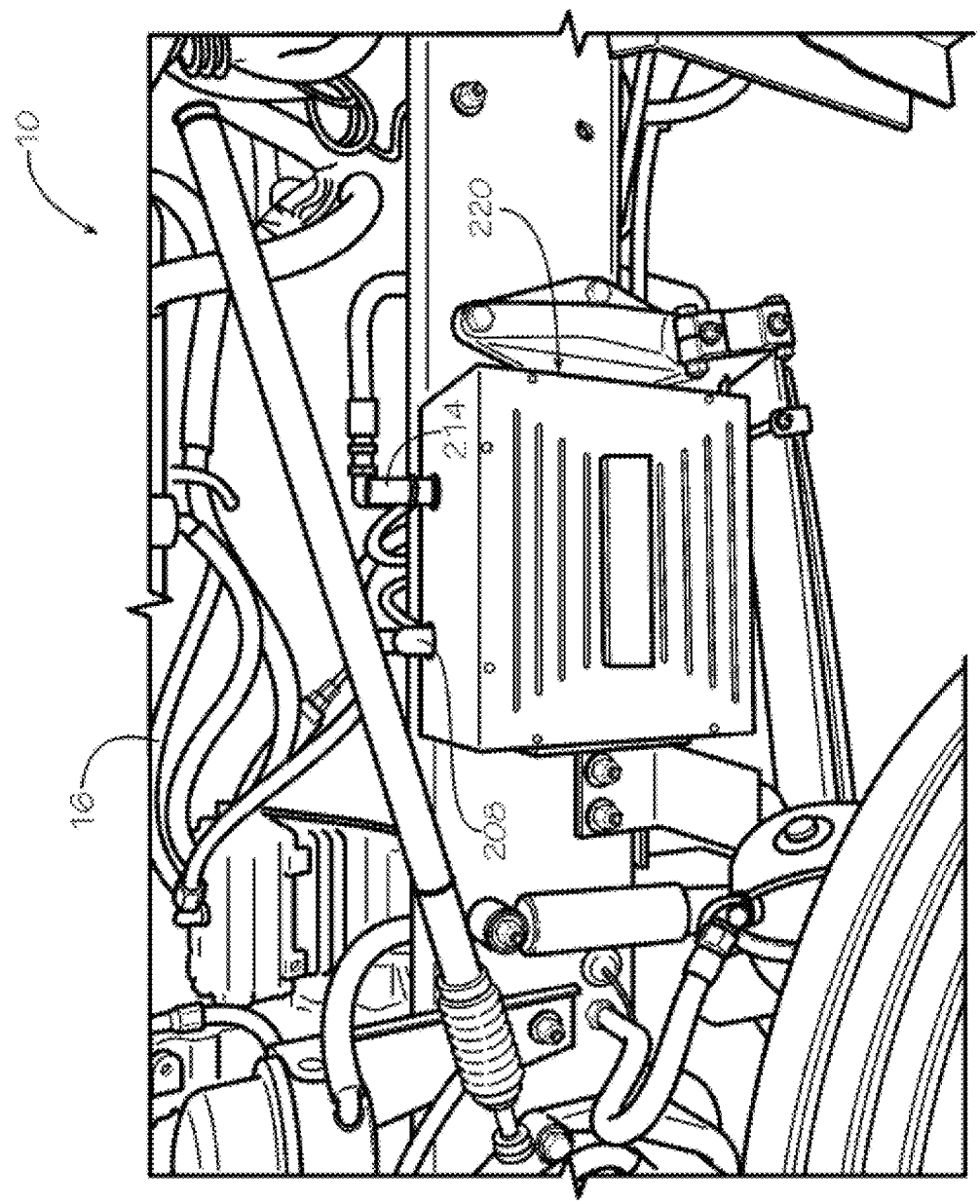
FIG. 14 illustrates a perspective view of an embodiment of a fuel heating apparatus in accordance with the present disclosure.

As seen in FIG. 14, fuel heating apparatus 220 may be positioned inside a housing or box mounted at a convenient location on a vehicle 16. The apparatus 200 is self-contained inside a housing having the unheated fuel inlet line 214 entering the housing, and a heated fuel supply line exiting the housing. One or more tube fittings are positioned on the box to allow modular interconnection with the existing fuel line. Similarly, a heat exchanger input fitting is disposed on the apparatus 200, and a heat exchanger output fitting is also disposed on the apparatus 200 to allow ease of connection with a heat exchanger working thermal fluid supply and return tubing. Placement of the housing at a convenient location such as on the frame allows a user to access the fuel filters and heat exchanger, as well as control modules and valves inside the housing with ease. In comparison to conventional oil filter placements on a vehicle which are very difficult to access, the combined unit with a modular arrangement in the housing provides enhanced operability and maintenance. Additionally, placement of the fuel filters inside a housing protects the filters from being hit or punctured by debris during use.

Figure 15:
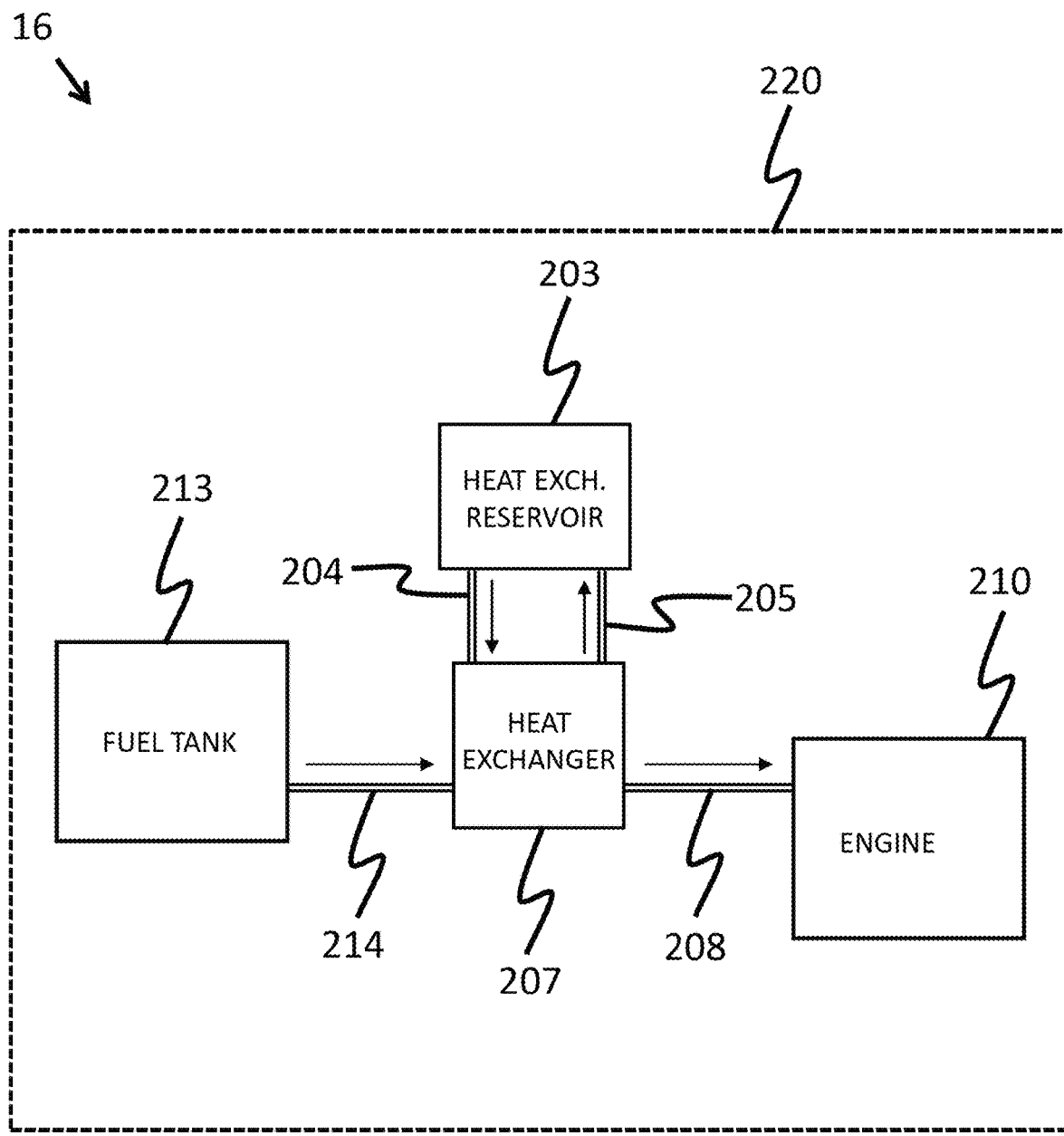
FIG. 15 illustrates a schematic view of an embodiment of a fuel heating apparatus including a heat exchanger in accordance with the present disclosure.

Referring now to FIGS. 15-32, the fuel heating apparatus 220 is shown, according to some embodiments of the present disclosure. Referring particularly to FIG. 15, the fuel heating apparatus 220 may include the heat exchanger 207, according to some embodiments. As discussed above with reference to FIG. 10, the heat exchanger 207 may receive a working thermal fluid (e.g., engine coolant, exhaust gas, heated liquid oil from the engine, heated fluid from the engine transmission, etc.) via the thermal fluid inlet line 204 and eject the thermal fluid to the thermal fluid reservoir 203 via the thermal fluid outlet line 205, thus providing heat to the heat exchanger 207. Simultaneously, the fuel from the fuel tank 213 may enter the heat exchanger 207 via the unheated fuel inlet line 214 exiting the fuel tank, travel through a fluid circuit within the heat exchanger 207, and exit the heat exchanger 207 via the heated fuel outlet line 208 before being received by the engine 210.

Figure 16:
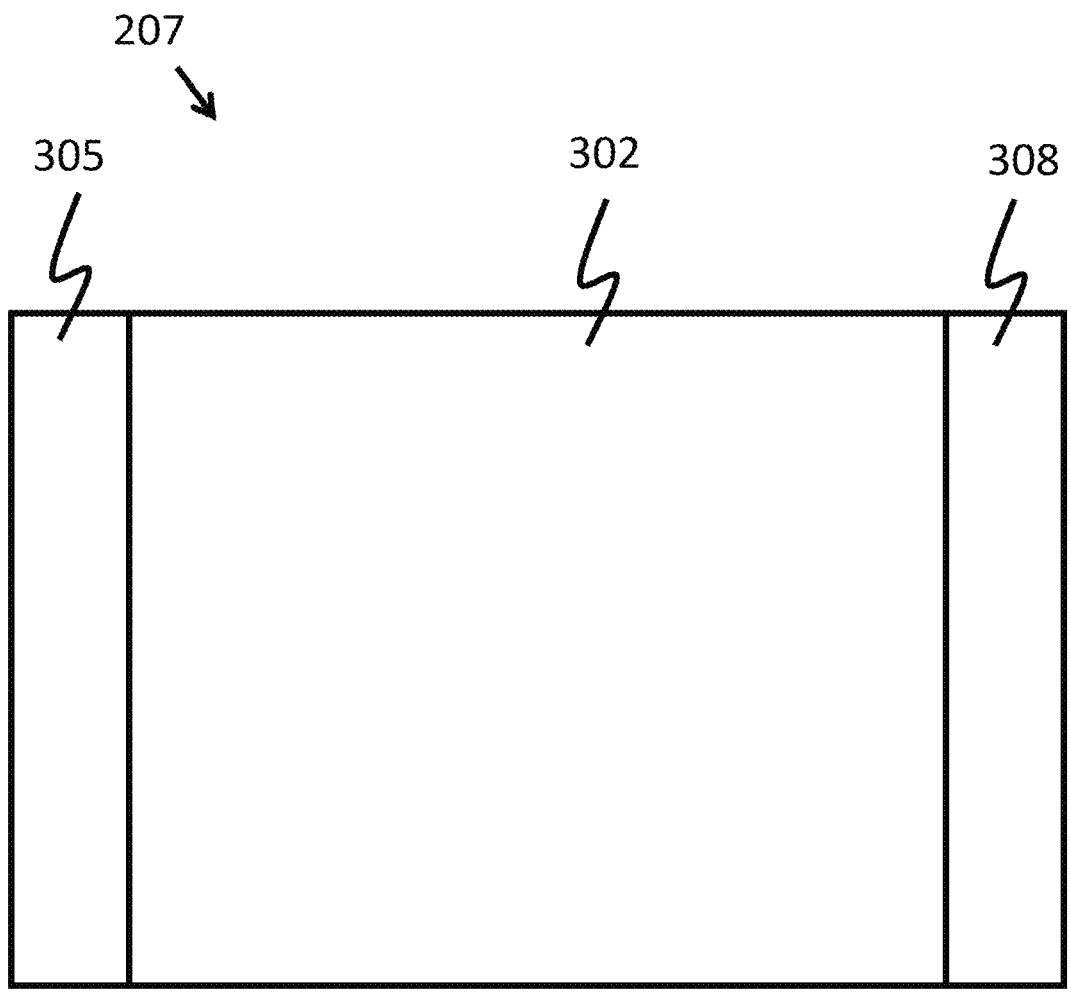
FIG. 16 depicts a side view of an embodiment of a heat exchanger in accordance with the present disclosure.
Figure 17A:
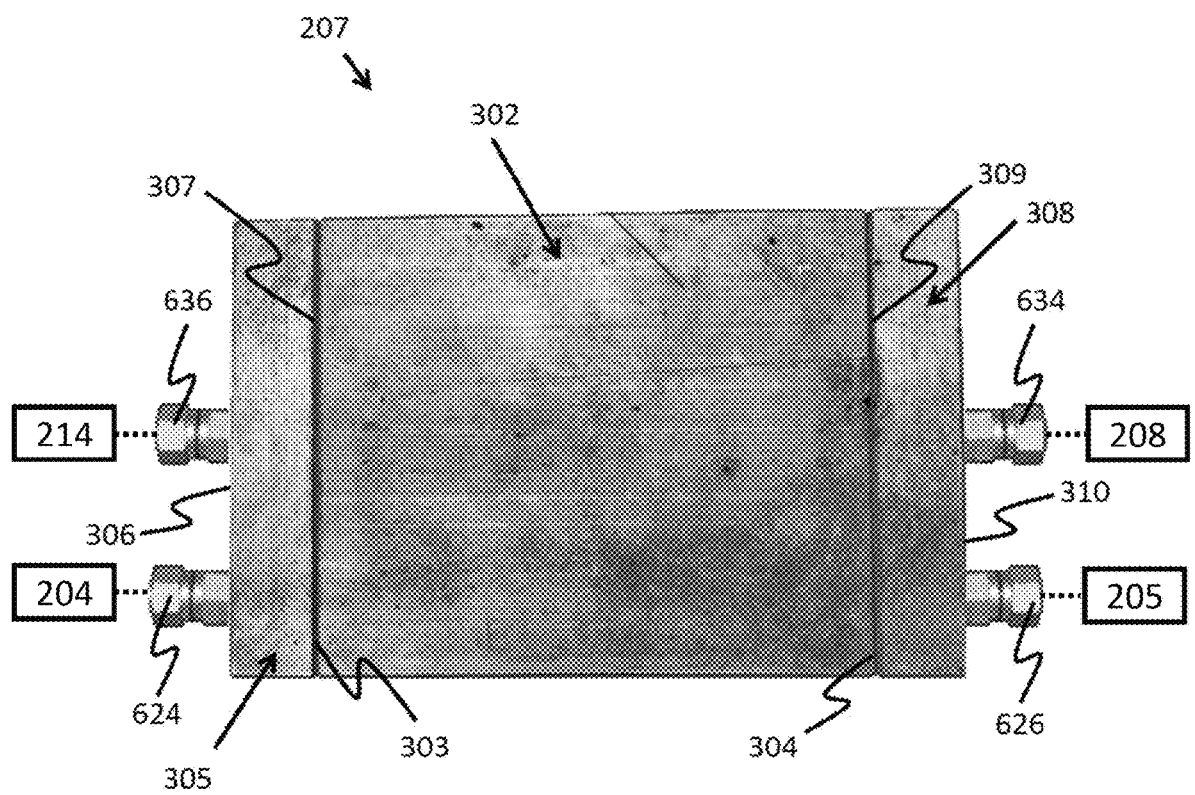
FIG. 17A depicts a side view of an embodiment of a heat exchanger in accordance with the present disclosure.
Figure 17B:
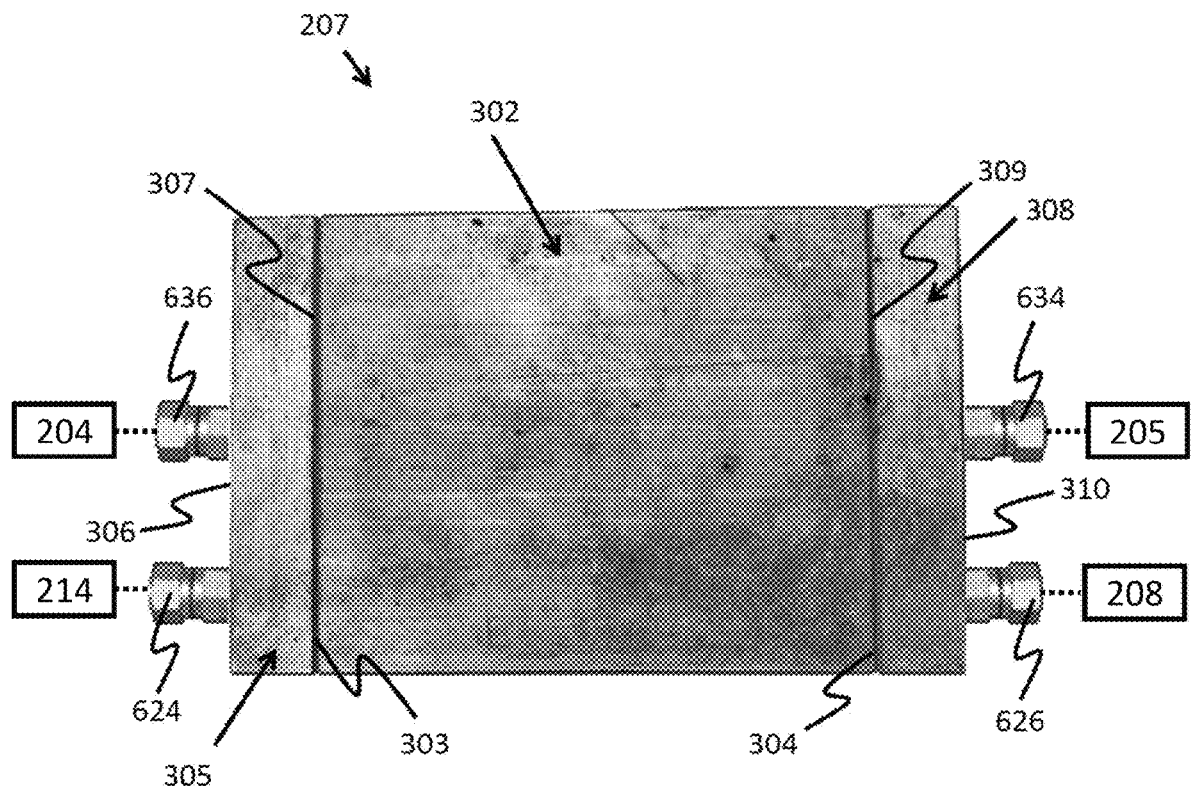
FIG. 17B depicts a side view of an embodiment of a heat exchanger in accordance with alternative embodiments of the present disclosure.

Referring particularly to FIGS. 16-17B, the heat exchanger 207 includes a main body 302, a first removable end plate 305 coupled to the main body 302, and a second removable end plate 308 coupled to the main body 302 opposite the first removable end plate 305, according to some embodiments of the present disclosure. The main body 302 may include a first side 303 that interfaces with the first removable end plate 305 and a second side 304 that interfaces with the second removable end plate 308.

Referring particularly to FIGS. 17A-17B, the first removable end plate 305 may include a first side 306, from which a first fluid supply coupling 624 and a second fluid supply coupling 636 may extend from, as well as a second side 307 that may interface with the first side 303 of the main body 302. The first fluid supply coupling 624 is configured to receive a first fluid, and the second fluid supply coupling 636 is configured to receive a second fluid. In some embodiments, the first fluid is thermal fluid (e.g., engine coolant, exhaust gas, heated liquid oil from the engine, or heated fluid from the transmission, etc.), and the second fluid is fuel. Thus, in such embodiments, and as shown with reference to FIG. 17A, the first fluid supply coupling 624 receives thermal fluid from the thermal fluid inlet line 204, and the second fluid supply coupling 636 receives unheated fuel from the unheated fuel inlet line 214. In alternative embodiments, the first fluid is fuel, and the second fluid is thermal fluid. Thus, in such alternative embodiments, and as shown with reference to FIG. 17B, the second fluid supply coupling 636 receives thermal fluid from the thermal fluid inlet line 204, and the first fluid supply coupling 624 receives unheated fuel from the unheated fuel inlet line 214.

Continuing to refer particularly to FIGS. 17A-17B, the second removable end plate 308 may include a first side 309 that interfaces with the second side 304 of the main body 302, as well as a second side 310, from which a first fluid return coupling 626 and a second fluid return coupling 634 may extend from. The first fluid return coupling 626 is configured to eject the aforementioned first fluid and the second fluid return coupling 634 is configured to eject the aforementioned second fluid. Thus, in such embodiments where the first fluid is thermal fluid and the second fluid is fuel, and as shown with reference to FIG. 17A, the first fluid return coupling 626 ejects thermal fluid to the thermal fluid outlet line 205, and the second fluid return coupling 634 ejects heated fuel to the heated fuel outlet line 208. Conversely, in such alternative embodiments where the first fluid is fuel and the second fluid is thermal fluid, and as shown with reference to FIG. 17B, the second fluid return coupling 634 ejects thermal fluid to the thermal fluid outlet line 205, and the first fluid return coupling 626 ejects heated fuel to the heated fuel outlet line 208.

As suggested above, the main body 302 may be positioned in between the first removable end plate 305 and the second removable end plate 308. In some embodiments, the first and second removable end plates 305, 308 have identical physical dimensions and are interchangeable.

Figure 18:
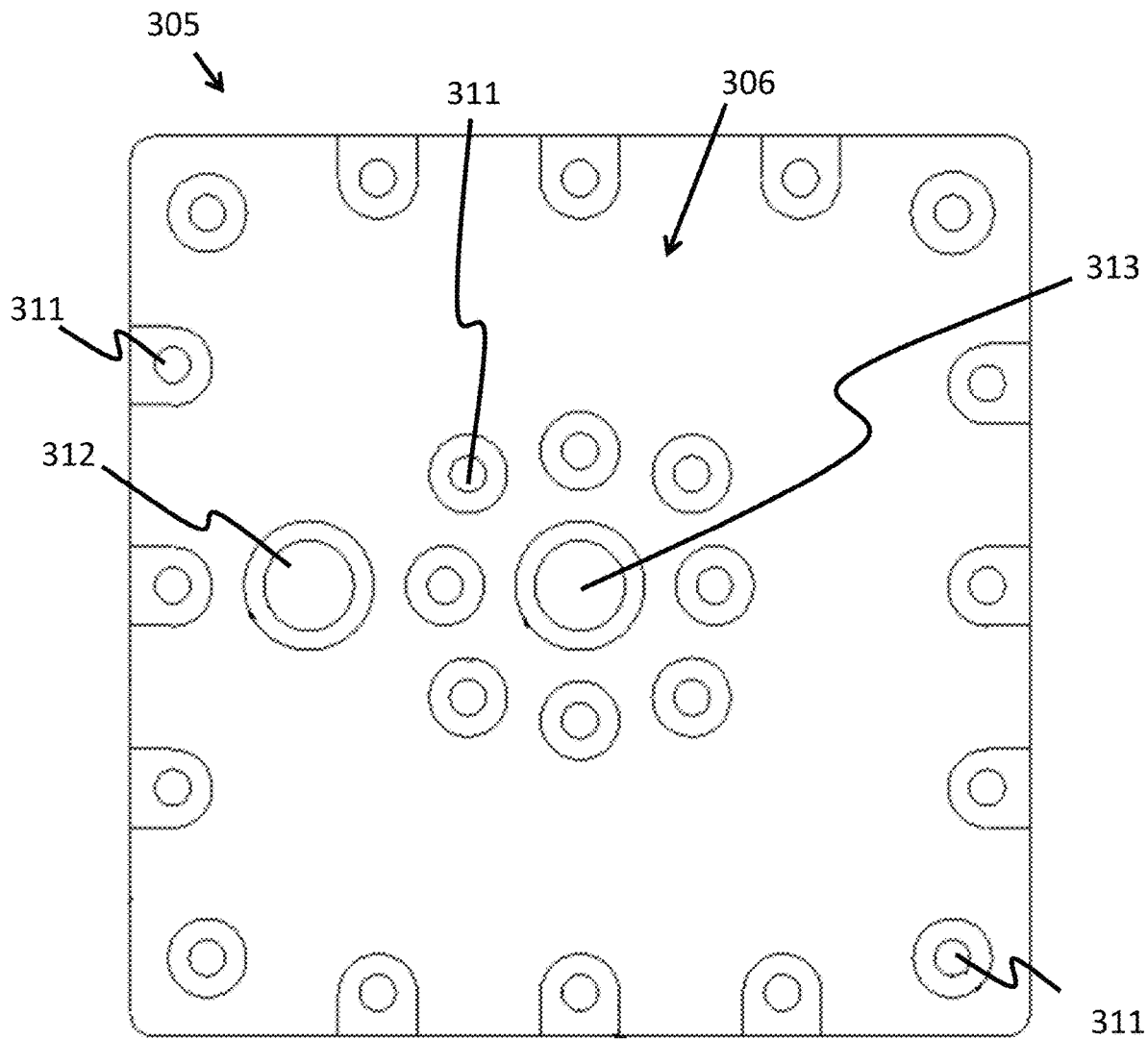
FIG. 18 depicts a front view of an embodiment of a first removable end cap for a heat exchanger in accordance with the present disclosure.
Figure 19:
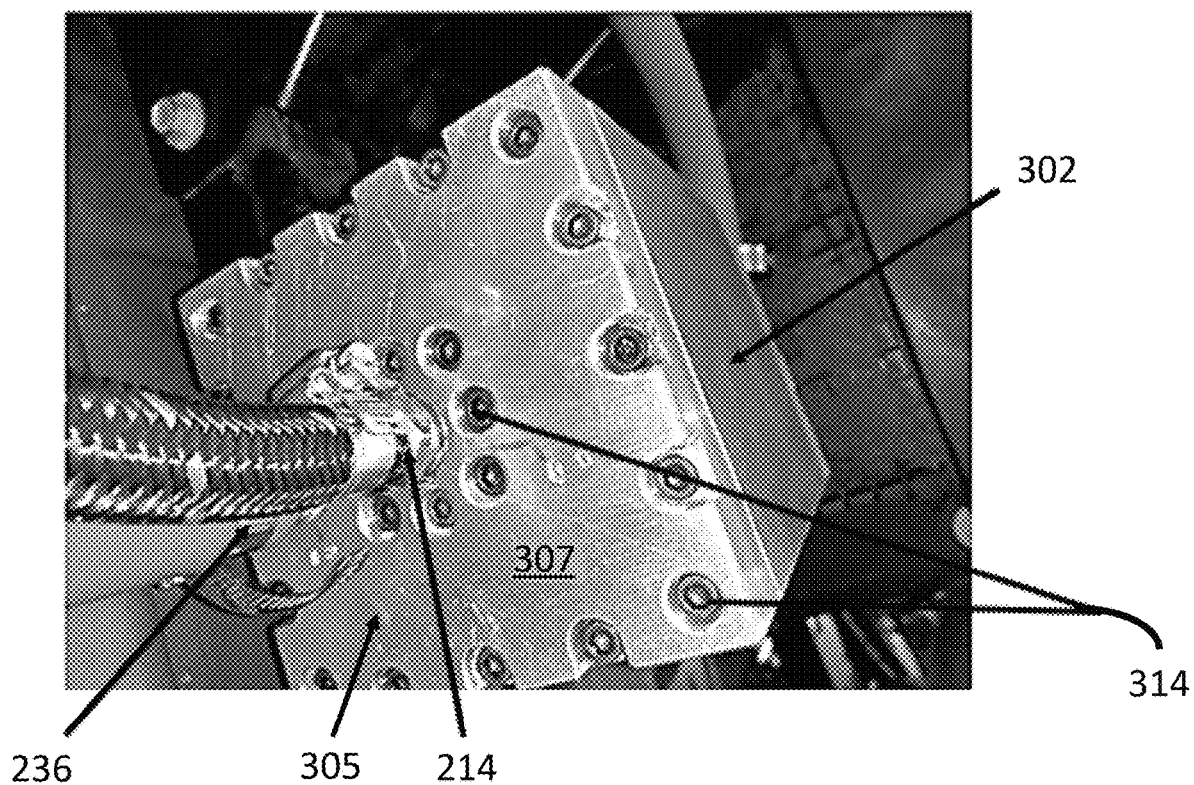
FIG. 19 illustrates an isometric view of an embodiment of a heat exchanger in accordance with the present disclosure.

Referring particularly to FIGS. 18-19, the first removable end plate 305 of the heat exchanger 207 (shown with reference to FIGS. 15-17B) is shown, according to some embodiments of the present disclosure. In particular, FIGS. 17A-17B show the first side 306 (e.g., the front side) of the first removable end plate 305, according to some embodiments, while FIG. 18 shows a perspective view of the first removable end plate 305 secured to the main body 302, according to some embodiments. In some embodiments, the first removable end plate 305 includes one or more fastener openings 311, a first fluid inlet opening 312, and a second fluid inlet opening 313. The first fluid inlet opening 312 may be configured to receive the first fluid from the first fluid supply coupling 624 (shown with reference to FIG. 17A-17B), while the second fluid inlet opening 313 may be configured to receive the second fluid from the second fluid supply coupling 636 (shown with reference to FIGS. 17A-17B). In some embodiments, the second fluid inlet opening 313 is located at the center of the first removable end plate 305 and on a longitudinal axis of the main body 302.

In some embodiments, the fastener openings 311 may be configured to receive one or more mechanical fasteners (e.g., screws, nuts, bolts, etc.) 314 in order to secure the first removable end plate 305 to the main body 302. As an example, the fastener openings 311 may include threading in order to receive the mechanical fasteners 314, which include corresponding threading. As another example, the fastener openings 311 may feature a smooth bore in order to facilitate the mechanical fasteners 314 engaging the main body 302 (as discussed below), such that the first removable end cap 305 is secured to the main body 302. In some embodiments, the first removable end plate 305 includes sixteen fastener openings 311 arranged (e.g., in a square fashion, a circular fashion, etc.) about the outer perimeter of the first removable end plate 305, as well as eight fastener openings 311 arranged (e.g., in a square fashion, in a circular fashion, etc.) about the second fluid inlet opening 313 (twenty-four in total). Each of the twenty-four fastener openings 311 may receive one of the mechanical fasteners 314 in order to secure the first removable end plate 305 to the main body 302.

Figure 20:
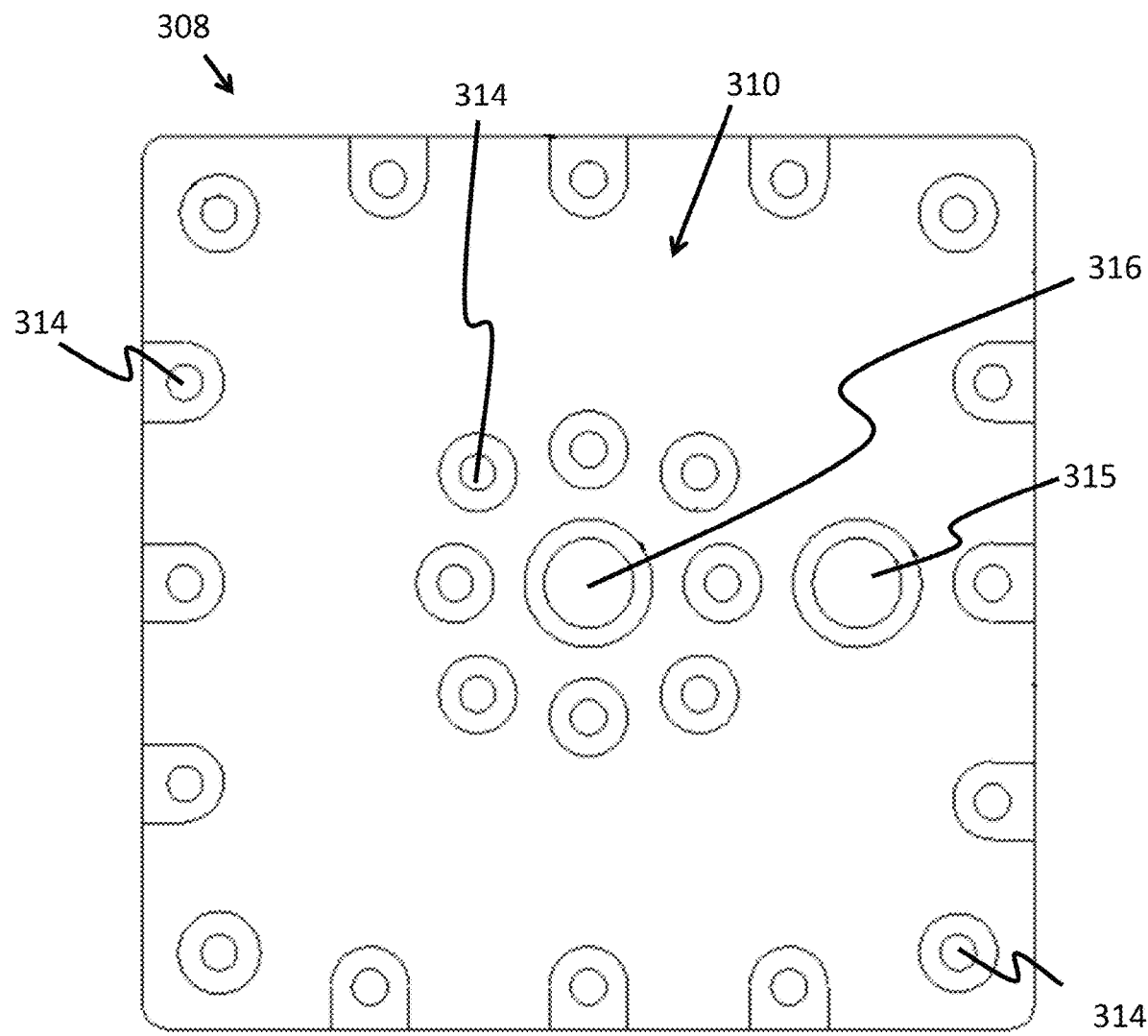
FIG. 20 depicts a front view of an embodiment of a second removable end cap for a heat exchanger in accordance with the present disclosure.

Referring now to FIG. 20, the second removable end plate 308 of the heat exchanger 207 (shown with reference to FIGS. 15-17B) is shown, according to some embodiments of the present disclosure. In particular, the second side 310 (e.g., the rear side) of the second removable end plate 308 is shown. In some embodiments, the second removable end plate 308 includes one or more fastener openings 301, a first fluid outlet opening 315, and a second fluid outlet opening 316.

The first fluid outlet opening 315 is configured to provide the first fluid to the first fluid return coupling 626, and the second fluid outlet opening 316 is configured to provide the second fluid to the second fluid return coupling 634.

Thus, in such embodiments where the first fluid is thermal fluid and the second fluid is fuel, the first fluid outlet opening 315 may be configured to provide exiting thermal fluid (e.g., thermal fluid leaving the heat exchanger 207) to the first fluid return coupling 626, while the second fluid outlet opening 316 may be configured to provide heated fuel to the second fluid return coupling 634. Conversely, in such embodiments where the first fluid is fuel and the second fluid is thermal fluid, the first fluid outlet opening may be configured to provide heated fuel to the first fluid return coupling 626, while the second fluid outlet opening 316 may be configured to provide exiting thermal fluid to the second fluid return coupling 634.

The fastener openings 301 of the second removable end plate 308 may be arranged and function similar to the fastener openings 311 of the first removable end plate 305 discussed above with reference to FIGS. 18-19. In some embodiments, the first fluid outlet opening 315 is located at the center of the second removable end plate 308 and on the longitudinal axis of the main body 302.

Figure 21:
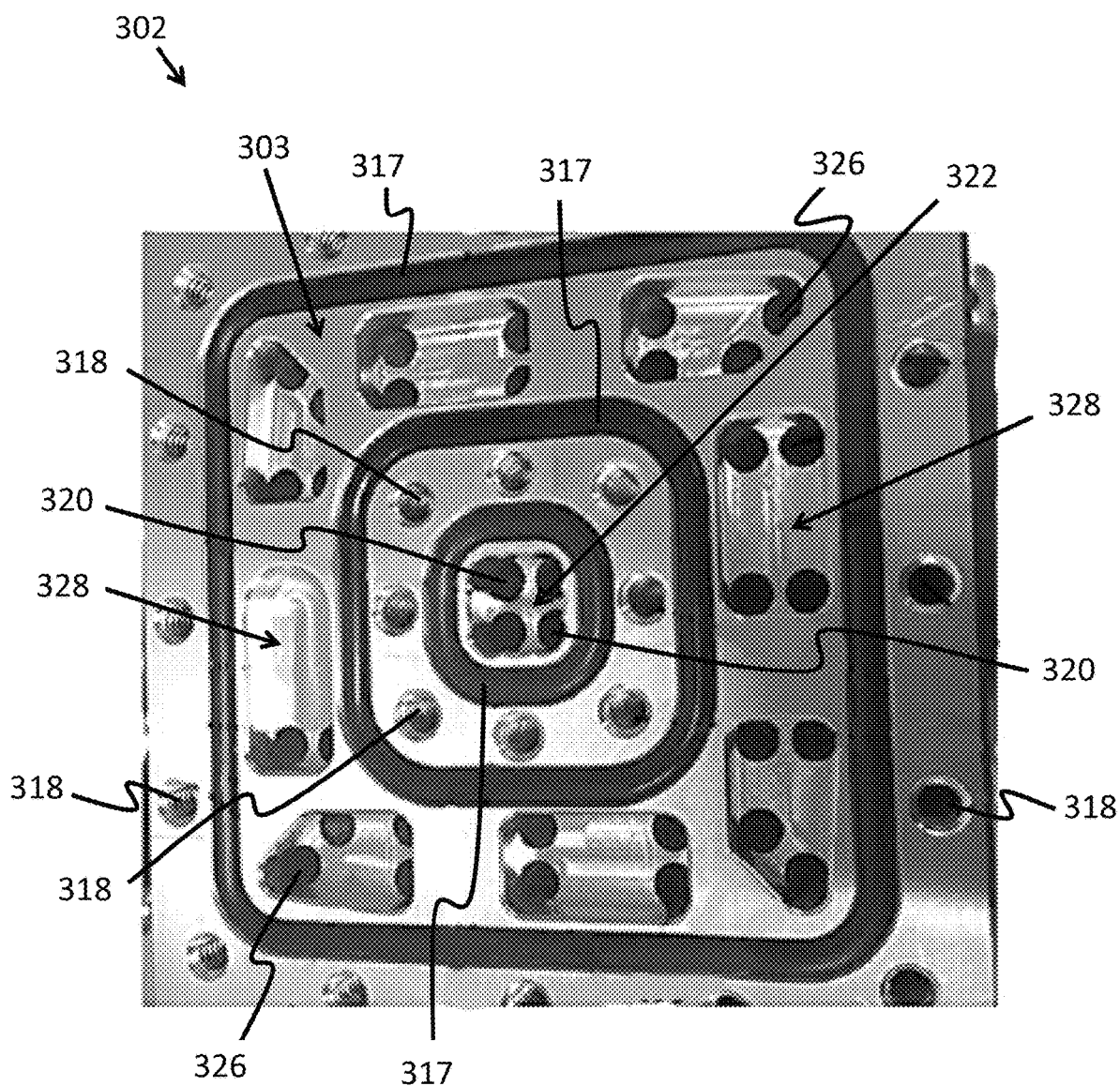
FIG. 21 depicts an isometric view of an embodiment of a main body for a heat exchanger in accordance with the present disclosure.
Figure 22:
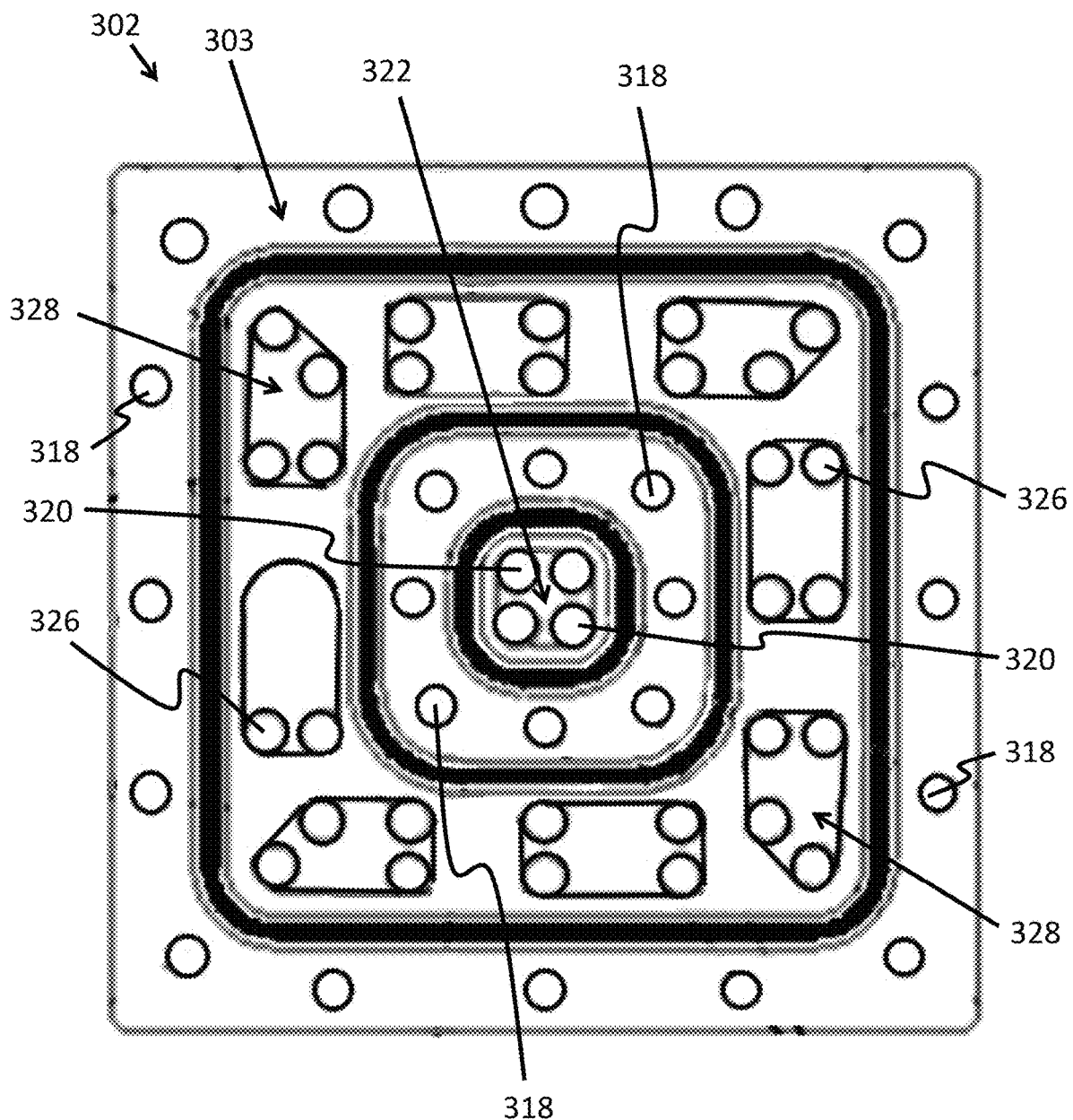
FIG. 22 depicts a front view of an embodiment of a main body for a heat exchanger in accordance with the present disclosure.
Figure 23:
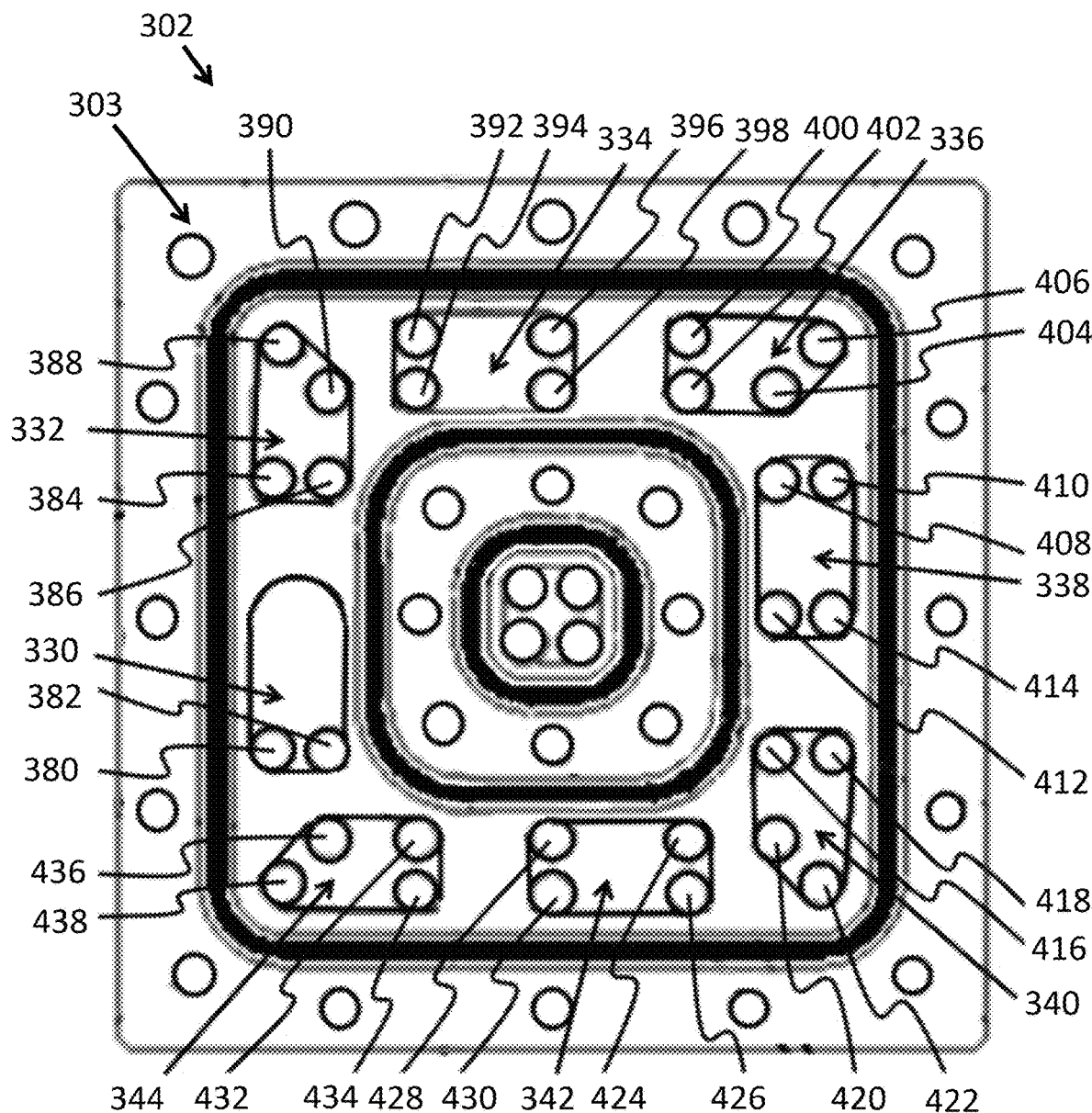
FIG. 23 depicts a front view of an embodiment of a main body for a heat exchanger in accordance with the present disclosure.
Figure 24:
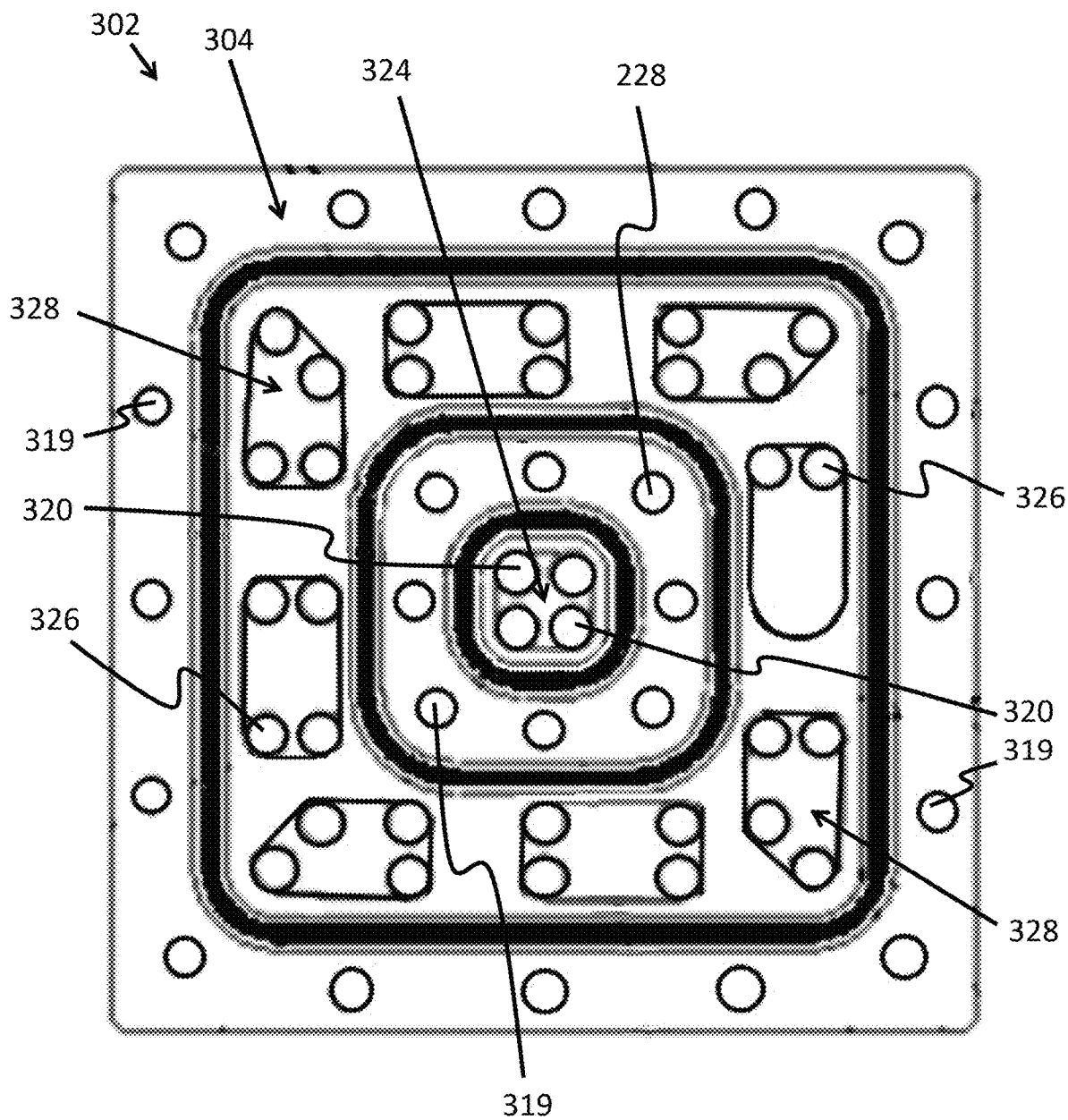
FIG. 24 depicts a rear view of an embodiment of a main body for a heat exchanger in accordance with the present disclosure.
Figure 25:
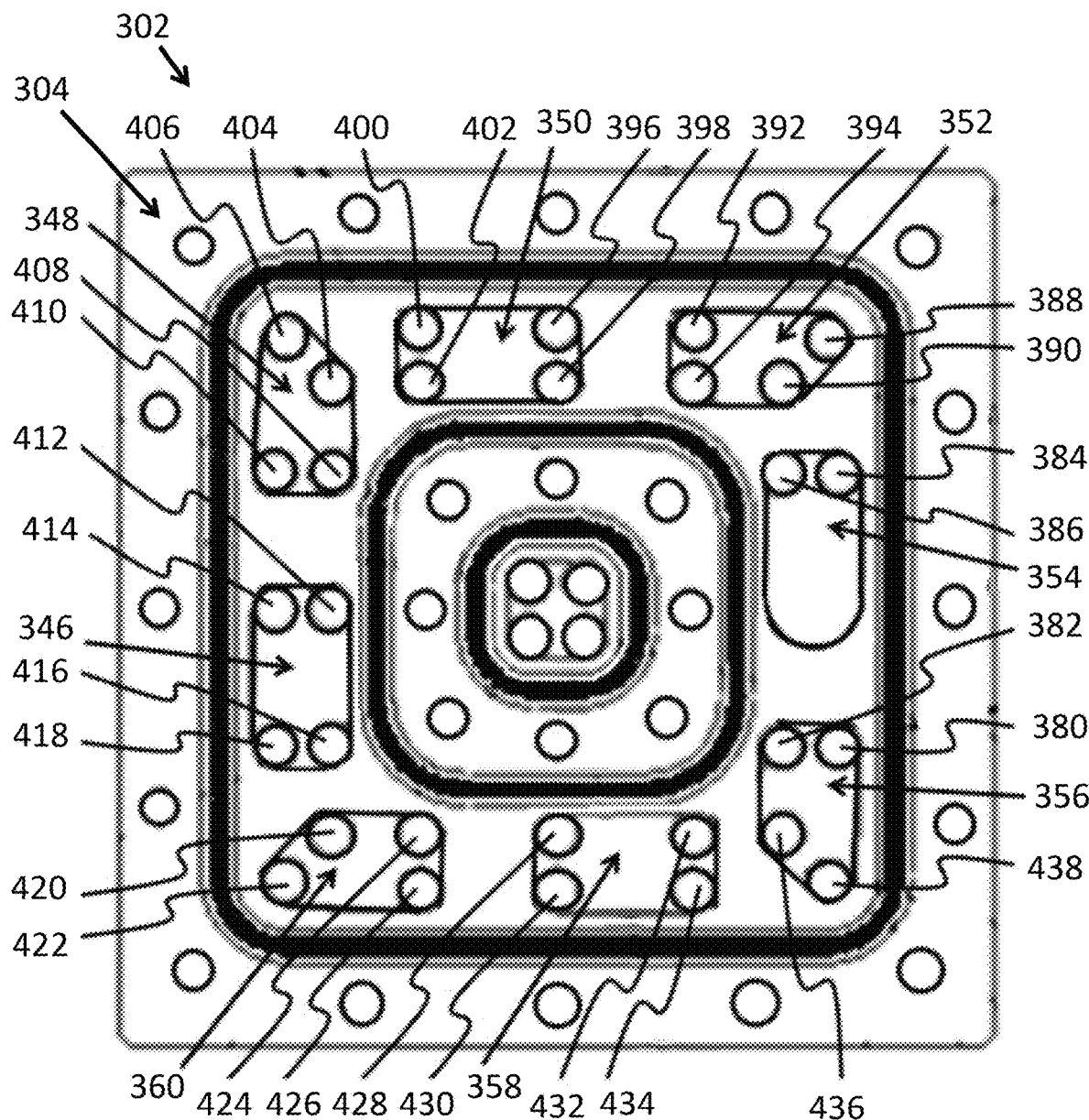
FIG. 25 depicts a rear view of an embodiment of a main body for a heat exchanger in accordance with the present disclosure.
Figure 26:
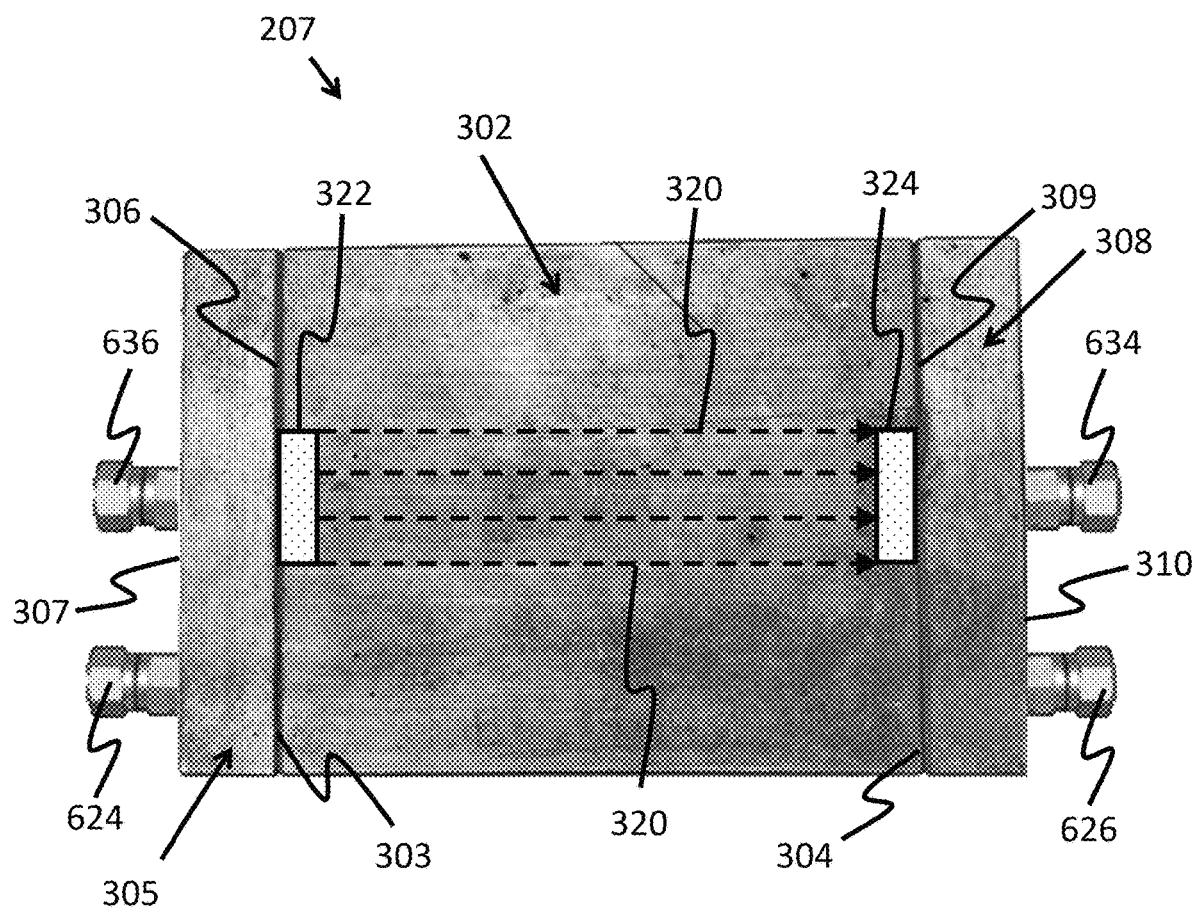
FIG. 26 depicts a side view of an embodiment of a heat exchanger in accordance with the present disclosure.
Figure 27:
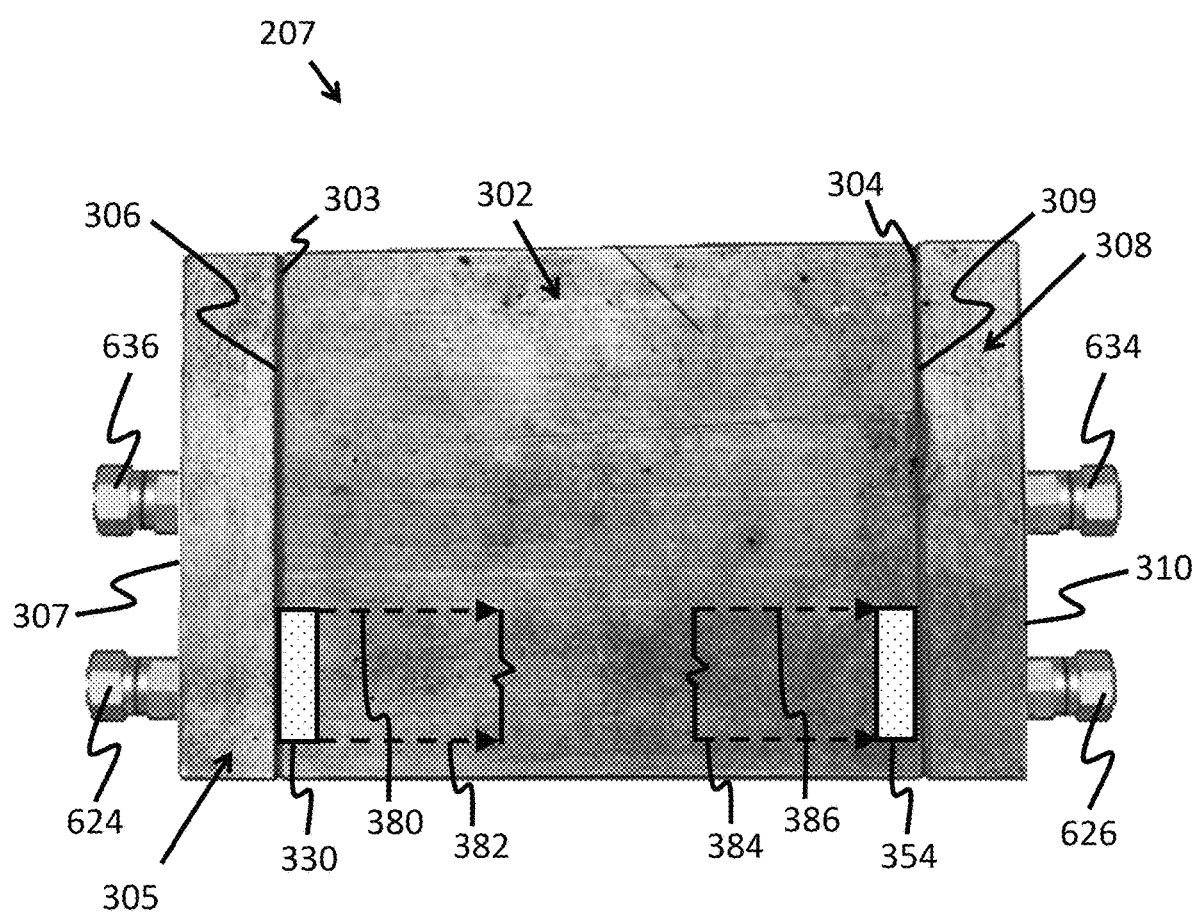
FIG. 27 depicts a side view of an embodiment of a heat exchanger in accordance with the present disclosure.

Referring now to FIGS. 21-27, the main body 302 of the heat exchanger 207 (shown with reference to FIGS. 15-17B) is shown, according to some embodiments of the present disclosure. In particular, FIGS. 21-23 depict the first side 303 (e.g., the front side) of the main body 302, according to some embodiments; FIGS. 24-25 depict the second side 304 (e.g., the rear side) of the main body 302, according to some embodiments; and FIGS. 26-27 depict the internal pathways (discussed below) of the main body 302, according to some embodiments. As described in greater detail below, the main body 302 may define various pathways (e.g., cavities, ducts, tunnels, passages, etc.) in order to transfer fuel and thermal fluid from the first side 303 of the main body 302 to the second side 304 of the main body 302, such that heat is exchanged between the thermal fluid and the fuel traveling through the heat exchanger 207, thereby heating the fuel. For example, heat may be dissipated into the body of the heat exchanger 207 (e.g., the main body 302, the first removable end cap 305, and/or the second removable end cap 308) by the thermal fluid as the thermal fluid travels through the body of the heat exchanger 207 as described herein, thereby raising the temperature of the body of the heat exchanger 207. In turn, the heat that was dissipated into the body of the heat exchanger 207 may be dissipated into the fuel as the fuel travels through the body of the heat exchanger 207 as described herein, thereby raising the temperature of the fuel.

In order to facilitate the exchange of the thermal fluid and fuel through the heat exchanger 207, the main body 302 may include one or more rubber seals 317 on the first side 303 and the second side 304, according to some embodiments.

As discussed above, the fastener openings 311 on the first removable end cap 305 may be configured to receive the mechanical fasteners 314 in order to secure the first removable end cap 305 to the main body 302. In turn, the first side 303 of the main body 302 may include one or more fastener openings 318 configured (e.g., threaded) to receive the mechanical fasteners 314. In this sense, the fastener openings 318 of the first side 303 of the main body 302 may be arranged in the same pattern as the fastener openings 311 of the first removable end cap 305. Likewise, the second side 304 of the main body 302 may define a similar arrangement of faster openings 319 in order to secure the second removable end cap 308 to the main body 302.

Referring particularly to FIGS. 21-22, 24, and 26, the main body 302 of the heat exchanger 207 (shown with reference to FIGS. 15-17B) includes a number of interior second fluid pathways 320 defined therein, extending from the first side 303 of the main body 302 to the second side 304 of the main body 302, according to some embodiments of the present disclosure. On the first side 303 of the main body 302, the second fluid pathways 320 may be in communication with the second fluid inlet opening 313 of the first removable end cap 305 (shown with reference to FIG. 18), while on the second side 304 of the main body 302, the second fluid pathways 320 may be in communication with the second fluid outlet opening 316 of the second removable end cap 308 (shown with reference to FIG. 20). The second fluid may thus travel through the second fluid supply coupling 636 (as discussed above with reference to FIGS. 17A-17B) and, in turn, the second fluid may travel through the second fluid inlet opening 313 (as discussed above with reference to FIG. 18) in order to be received by the main body 302 and travel through the second fluid pathways 320. The second fluid may leave the heat exchanger 207 by traveling through the second fluid outlet opening 316 (as discussed above with reference to FIG. 20) of the and, in turn, the second fluid return coupling 634 (as discussed above with reference to FIGS. 17A-17B).

In some embodiments, each of the second fluid pathways 320 extend from the first side 303 of the main body 302 to the second side 304 of the main body 302. For example, the second fluid pathways 320 may extend from a second fluid start point (e.g., a cavity, pocket, recess, etc.) 322 defined on the first side 303 of the main body 302, along the longitudinal length of the main body 302, and terminate at a second fluid end point 324 defined on the second side 304 of the main body 302. The second fluid start point 322 may be defined on the first side 303 of the main body 302 at a location where the second fluid inlet opening 313 of the first removable end cap 305 meets the main body 302, while the second fluid end point 324 may be defined on the second side 304 of the main body 302 at a location where the second fluid outlet opening 316 of the second removable end cap 308 meets the main body 302. As shown, the main body 302 may include four second fluid pathways 320. However, in other embodiments, the main body 302 may include more second fluid pathways 320 (e.g., six, eight, etc.) or less second fluid pathways 320 (e.g., three, two, or one).

In some embodiments, due to the sealed engagement between the first removable end cap 305 and the first side 303 of the main body 302, the second fluid start point 322 is in fluid communication with the second fluid inlet opening 313 (and, thus the second fluid supply coupling 636), as well as the second fluid pathways 320. Similarly, due to the sealed engagement between the second removable end cap 308 and the second side 304 of the main body 302, the second fluid end point 324 may be in fluid communication with the second fluid outlet opening 316 (and, thus the second fluid return coupling 634), as well as the second fluid pathways 320. In order to facilitate a steady flow of the second fluid through the heat exchanger 207, the combined cross-sectional area of the second fluid pathways 320 may be equivalent (or substantially equivalent) to the cross-sectional area of the second fluid start point 322, the second fluid end point 324, the second fluid inlet opening 313, and/or the second fluid outlet opening 316.

Referring particularly to FIGS. 21-22, 24, and 27, the main body 302 of the heat exchanger 207 (shown with reference to FIGS. 15-17B) defines an interior first fluid pathway therein, according to some embodiments of the present disclosure. The interior first fluid pathway may travel back and forth between the first and second removable plates 305, 308 a number of times before ejecting the first fluid from the main body 302. In order to facilitate this feature, the interior first fluid pathway includes a number of interior straight first fluid passages 326 defined along the longitudinal axis of the main body 302, and a number of first fluid plenums (e.g., fluid bridgeways, pockets, cavities, etc.) 328 defined perpendicular to the longitudinal axis of the main body 302. The first fluid plenums 328 may be defined on the first and second sides 303, 304 of the main body 302 and be in fluid communication with the straight first fluid passages 326. As described in greater detail below, the interior first fluid pathway (e.g., the straight first fluid passages 326 and the first fluid plenums 328) may be arranged to receive the first fluid, transfer the first fluid back and forth between the first and second sides 303, 304 of the main body 302 (via the first fluid plenums 328) in a manner that migrates the first fluid in a step-wise, circular (or, in other words, a square) fashion about the longitudinal axis of the main body 302, outside of the second fluid pathways 320, and ultimately eject the first fluid from the main body 302. As shown, the main body 302 may include thirty straight first fluid passages 326. However, in other embodiments, the main body 302 may include more (e.g., thirty-six, forty, etc.) straight first fluid passages 326, or less (e.g., twenty-four, twenty, etc.) straight first fluid passages 326. In order to prevent the second fluid from leaking into the straight first fluid passages 326 from the second fluid pathways 320 (and, as a corollary, to prevent the first fluid from leaking into the second fluid pathways 320 from the straight first fluid passages 326), the rubber seals 317 may be located on the first and second sides 303, 304 of the main body 302 so as to encompass the second fluid pathways 320 and the straight first fluid passages 326.

In some embodiments, the first side 303 of the main body 302 includes eight individual first fluid plenums 328: first fluid plenums 330, 332, 334, 336, 338, 340, 342, and 344. The eight first fluid plenums 330-344 may be held in fluid communication with the straight first fluid passages 326 via the sealed engagement between the first side 303 of the main body 302 and the first removable end cap 305. Similarly, the second side 304 of the main body 302 may include eight first fluid plenums 328: first fluid plenums 346, 348, 350, 352, 354, 356, 358, and 360. The eight first fluid plenums 346-360 may be held in fluid communication with the straight first fluid passages 238 via the sealed engagement between the second side 304 of the main body 302 and the second removable end cap 308. As mentioned above, the straight first fluid passages 326 may include thirty individual passages: 380, 382, 384, 386, 388, 390, 392, 394, 396, 398, 400, 402, 404, 406, 408, 410, 412, 414, 416, 418, 420, 422, 424, 426, 428, 430, 432, 434, 436, and 438. In order to facilitate the transfer of the first fluid back and forth in a step-wise, circular fashion as suggested above, the first fluid plenums 330-344 on the first side 303 of the main body 302 may be arranged in an asymmetrical fashion as compared to the first fluid plenums 346-360 on the second side 304 of the main body 302, such that the first fluid is received in one of the first fluid plenums 346-360 on the first side 303, transferred to one of the first fluid plenums 346-360 on the second side 304, and transferred to one of the first fluid plenums 346-360 on the first side 303 that is adjacent to (e.g., located asymmetrically from) the one of the first fluid plenums 346-360 at which the first fluid was previously received.

An exemplary process of the transfer of the first fluid back and forth in a step-wise, circular fashion is discussed below, according to some embodiments of the present disclosure. First, the first fluid may enter the first fluid plenum 330 on the first side 303 of the main body 302 (via the first fluid inlet opening 312 on the first removable end cap 305). In this sense, analogous to the second fluid start point 322 discussed above, the first fluid plenum 330 may be defined on the first side 303 of the main body 302 at a location where the first fluid inlet opening 312 of the first removable end cap 305 engages with the first side 303 and function as a first fluid start point. Second, the first fluid may travel from the first side 303 to the second side 304 of the main body via the straight first fluid passages 380 and 382, and be received at the first fluid plenum 356, which holds the straight first fluid passages 380 and 382 in communication with the straight first fluid passages 436 and 438. Third, therefore, the first fluid may be transferred via the first fluid plenum 356 to the straight first fluid passages 436 and 438, such that the first fluid travels from the second side 304 to the first side 303, and is received at the first fluid plenum 344, which holds the straight first fluid passages 436 and 438 in fluid communication with the straight first fluid passages 432 and 434. Accordingly, it can be observed that the first fluid has been transferred back and forth in a step-wise, circular fashion (clockwise from the first fluid plenum 330 to the first fluid plenum 344).

The process described above may be repeated multiple times in order to transfer the first fluid back and forth in a step-wise, circular fashion until the first fluid is ejected from the first fluid outlet opening 315 on the second removable end cap 308. For example, the first fluid may be transferred between the first fluid plenums 344 and 358 (e.g., from the first fluid plenum 344 to the first fluid plenum 358) via the straight first fluid passages 432 and 434; the first fluid may be transferred between the first fluid plenums 358 and 342 via the straight first fluid passages 428 and 430; the first fluid may be transferred between the first fluid plenums 342 and 360 via the straight first fluid passages 424 and 426; the first fluid may be transferred between the first fluid plenums 360 and 340 via the straight first fluid passages 420 and 422; the first fluid may be transferred between the first fluid plenums 340 and 346 via the straight first fluid passages 416 and 418; the first fluid may be transferred between the first fluid plenums 346 and 338 via the straight first fluid passages 412 and 414; the first fluid may be transferred between the first fluid plenums 338 and 348 via the straight first fluid passages 408 and 410; the first fluid may be transferred between the first fluid plenums 348 and 336 via the straight first fluid passages 404 and 406; the first fluid may be transferred between the first fluid plenums 336 and 350 via the straight first fluid passages 400 and 402; the first fluid may be transferred between the first fluid plenums 350 and 334 via the straight first fluid passages 396 and 398; the first fluid may be transferred between the first fluid plenums 334 and 352 via the straight first fluid passages 392 and 394; the first fluid may be transferred between the first fluid plenums 352 and 332 via the straight first fluid passages 388 and 390; the first fluid may be transferred between the first fluid plenums 332 and 354 via the straight first fluid passages 384 and 386; and, ultimately, the first fluid may be ejected from the first fluid plenum 354 through the first fluid outlet opening 315. In this sense, analogous to the second fluid end point 324 discussed above, the first fluid plenum 354 may be defined on the second side 304 of the main body 302 at a location where the first fluid outlet opening 315 of the second removable end cap 308 engages with the second side 304 and may function as a first fluid end point.

As suggested above, the straight first fluid passages 326 may operate in pairs. In this sense, pairs of the straight first fluid passages 326 may receive the first fluid from the same one of the first fluid plenums 328, transfer the first fluid in the same direction along the longitudinal axis of the main body 302, and deposit the first fluid in the same first fluid plenum 328. Following the example above, straight first fluid passages 380 and 382 may form a pair; straight first fluid passages 436 and 438 may form a pair; straight first fluid passages 432 and 434 may form a pair; straight first fluid passages 428 and 430 may form a pair; straight first fluid passages 424 and 426 may form a pair; straight first fluid passages 420 and 422 may form a pair; straight first fluid passages 416 and 418 may form a pair; straight first fluid passages 412 and 414 may form a pair; straight first fluid passages 408 and 410 may form a pair; straight first fluid passages 404 and 406 may form a pair; straight first fluid passages 400 and 402 may form a pair; straight first fluid passages 396 and 398 may form a pair; straight first fluid passages 392 and 394 may form a pair; straight first fluid passages 388 and 390 may form a pair; and straight first fluid passages 384 and 386 may form a pair. In this sense, in other embodiments of the present disclosure, the pairs of straight first fluid passages 326 may be combined as single pathways, or further divided into three or four pathways, depending on the implementation.

As suggested by the exemplary embodiment discussed herein, there may be thirty straight first fluid passages 326 defined throughout the main body 302 and eight first fluid plenums 328 defined on each of the first and second sides 303, 304 of the main body 302. One first fluid plenum 328 on the first side 303 of the main body 302 (e.g., the first fluid plenum 330) may be in fluid communication with two straight first fluid passages 326 (e.g., the straight first fluid passages 380 and 382) and the first fluid inlet opening 312, while seven first fluid plenums 328 on the first side 303 of the main body 302 may each be in fluid communication with four straight first fluid passages 326. Similarly, one first fluid plenum 328 on the second side 304 of the main body 302 (e.g., the first fluid plenum 354) may be in fluid communication with two straight first fluid passages 326 (e.g., the straight first fluid passages 384 and 386) and the first fluid outlet opening 315, while seven first fluid plenums 328 on the second side 304 of the main body 302 may each in fluid communication with four of the straight first fluid passages 326.

As suggested above, a number of threaded fasteners 314 may be used to secure the first and second removable end plates 305, 308 to the main body 302. In the exemplary embodiment discussed herein, the threaded fasteners 314 may include forty-eight threaded fasteners 314. Sixteen of the forty-eight threaded fasteners 314 may be located, relative to the longitudinal axis of the main body 302, in between the second fluid pathways 320 and the interior first fluid pathway (e.g., the straight first fluid passages 326 and the first fluid plenums 328), and thirty-two of the threaded fasteners 314 may be located, relative to the longitudinal axis of the main body 302, outside of the interior first fluid pathway.

As discussed above with reference to FIGS. 21-22, 24, and 26, the main body 302 may include four second fluid pathways 320; and as discussed above with reference to FIGS. 21-22, 24, and 27, the main body 302 may include thirty straight first fluid passages 326. Of course, it should be appreciated that the embodiments of the present disclosure depicted herein are non-limiting in nature, and are provided as exemplary implementations of the circulating thermal fluid through the heat exchanger 207 until the material of the heat exchanger 207 reaches the same temperature as the thermal fluid (e.g., a "steady state" temperature), thereby heating the fuel prior to delivering the fuel to the engine for combustion. For example, in other embodiments, the main body 302 may include more (e.g., thirty-six, forty, etc.) straight first fluid passages 326, or less (e.g., twenty-four, twenty, etc.) straight first fluid passages 326; and the main body 302 may include more second fluid pathways 320 (e.g., six, eight, etc.) or less second fluid pathways 320 (e.g., three, two, or one). Moreover, as discussed herein, the first fluid traveling through the interior first fluid pathway (formed by the straight first fluid passages 326 and the first fluid plenums 328) may be thermal fluid; while the second fluid traveling through the second fluid pathways 320 may be fuel. In other embodiments, the first fluid may be fuel; while the second fluid may be thermal fluid. Thus, the present disclosure provides for a number of approaches to heating the fuel prior to delivering the fuel to the engine for combustion. Even further, the bypass valve 212 discussed above with reference to FIG. 10, as well as the first and second flow controllers 206a and 206b discussed above with reference to FIG. 10, may be used to further implement heating the fuel prior to delivering the fuel to the engine for combustion.

Figure 28:
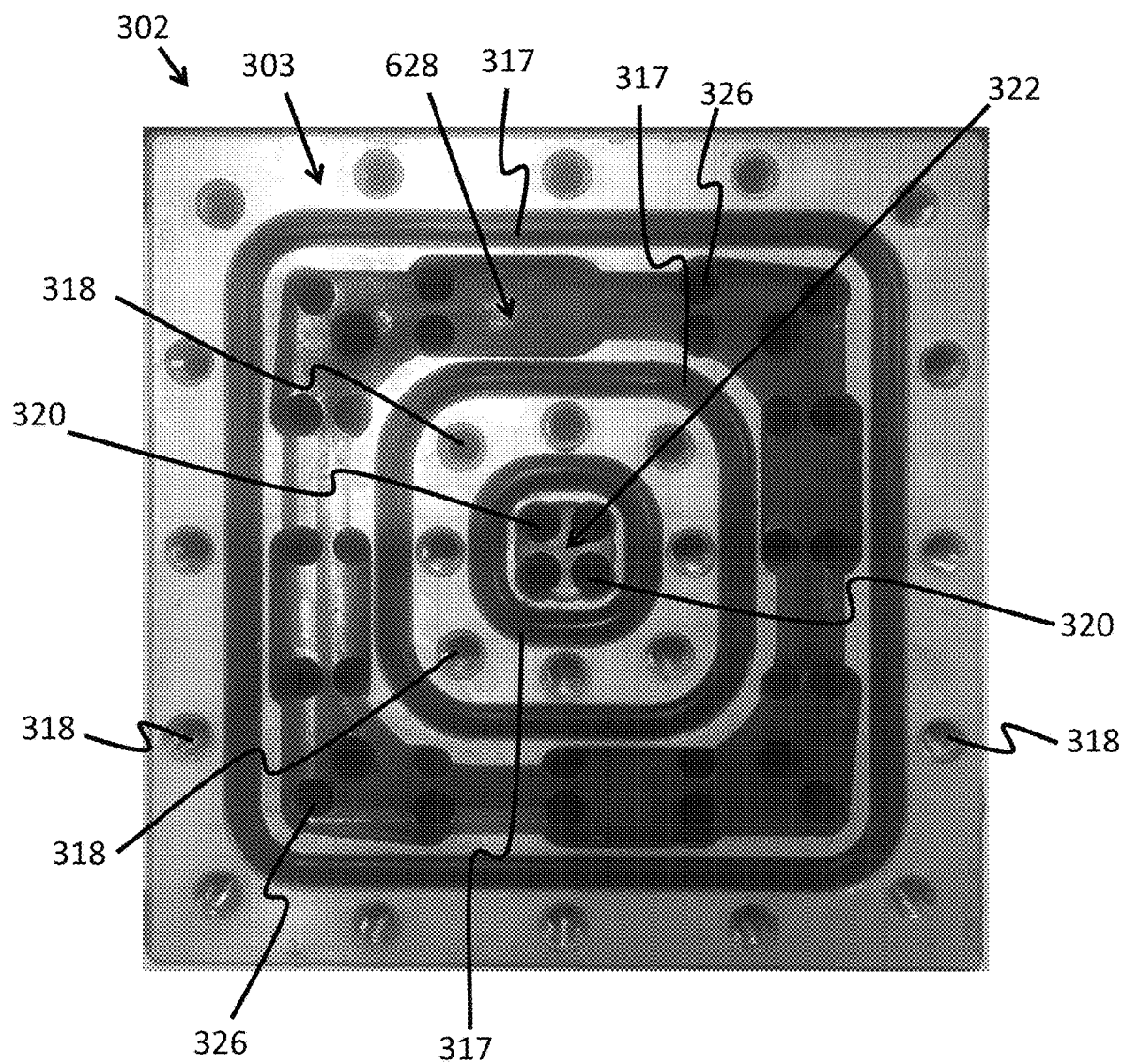
FIG. 28 depicts a front view of an alternative embodiment of a main body for a heat exchanger in accordance with the present disclosure.
Figure 29:
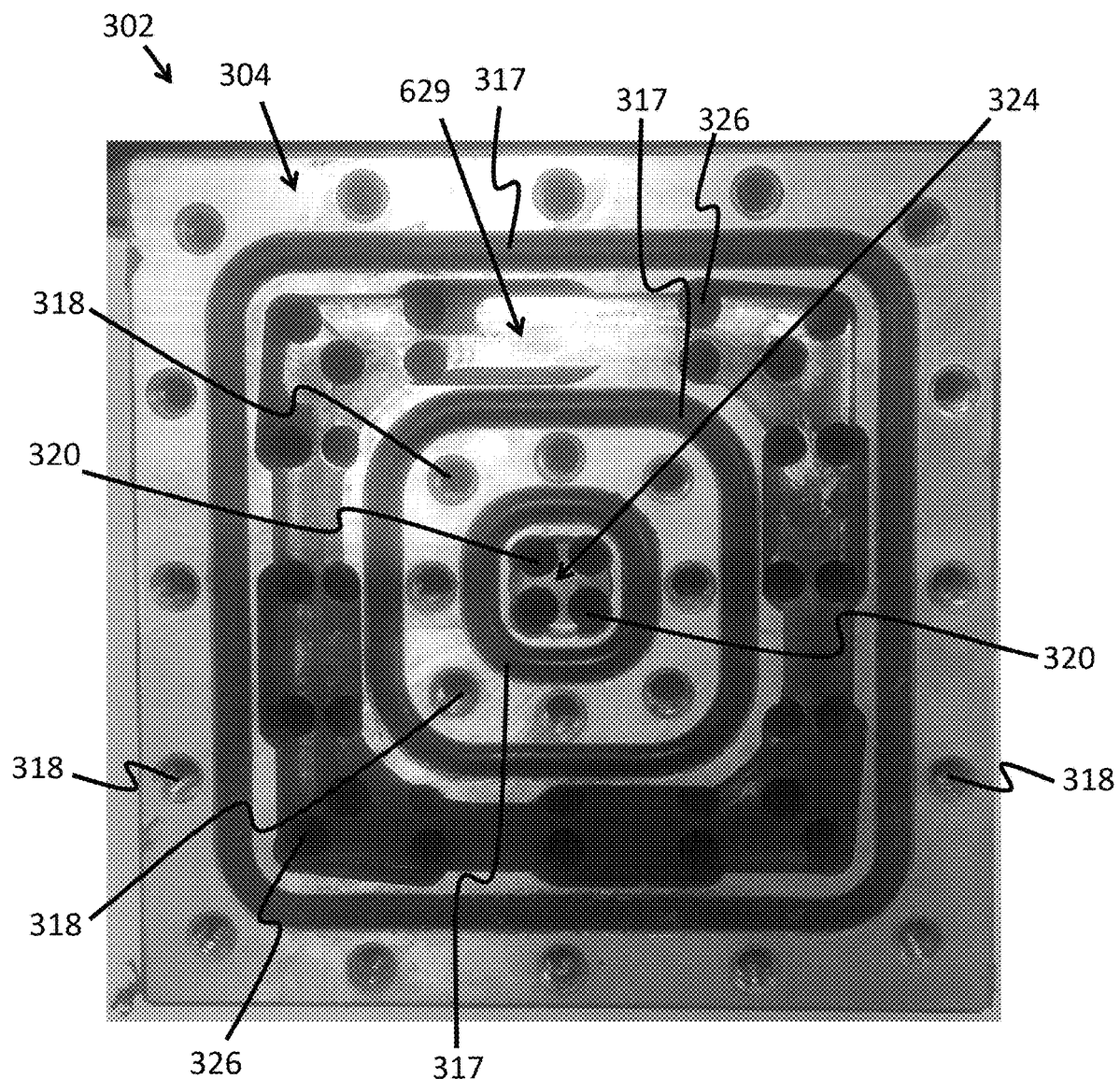
FIG. 29 depicts a rear view of an alternative embodiment of a main body for a heat exchanger in accordance with the present disclosure.

Referring now to FIGS. 28-29, the main body 302 of the heat exchanger 207 (shown with reference to FIGS. 15-17B and 26-27) is shown, according to some alternative embodiments of the present disclosure. As shown, the first fluid plenums 328 may not be defined on the first and second sides 303, 304 of the main body 302 and be in fluid communication with the straight first fluid passages 326. Rather, a first annular cavity 628 may be defined on the first side 303 of the main body 302, and a second annular cavity 629 may be defined on the second side 304 of the main body 302. The first annular cavity 628 may be in fluid communication with the first fluid inlet opening 312, as well as the straight first fluid passages 326, and thus function as a first fluid start point. Similarly, the second annular cavity 629 may be in fluid communication with the first fluid outlet opening 315, as well as the straight first fluid passages 326, and thus function as a first fluid end point. Thus, the first fluid may be received at the first fluid inlet opening 312, travel into the first annular cavity 628, through the straight first fluid passages 326, into the second annular cavity 629, and travel through the first fluid outlet opening 315 (e.g., without traveling back and forth between the first and second removable plates 305, 308, as discussed above). In such embodiments, then, the interior first fluid pathway may simply be formed by the straight first fluid passages 326. Of course, the second fluid may still travel from the second fluid start point 322, through the second fluid pathways 320, and to the second fluid end point 323.

Referring generally to FIGS. 15-29, and as discussed above, the heat exchanger 207 (and the second fluid pathways 320 therein) may receive thermal fluid from the thermal fluid reservoir 203 via the thermal fluid inlet line 204 and return the thermal fluid to the thermal fluid reservoir 203 (where the thermal fluid is re-heated, according to some embodiments) via the thermal fluid outlet line 205, thereby allowing the thermal fluid to be circulated through the heat exchanger 207.

In such embodiments where the first fluid is thermal fluid and the second fluid is fuel, the circulation of the thermal fluid through the interior first fluid pathway (e.g., the straight first fluid passages 326, and the first fluid plenums 328 or the first and second annular cavities 628, 629) may result in the rising of the temperature of the main body 302 of the heat exchanger 207. The longer that the thermal fluid is circulated through interior first fluid pathway, the warmer the main body 302 (along with the first and second removable endcaps 305, 308, in some embodiments) becomes, until the material of the main body 302 reaches the same temperature as the thermal fluid (e.g., a "steady state" temperature). The simultaneous passage of the fuel though the second fluid pathways 320 defined in the material of the main body 302 may thus result in the heating of the fuel that is transferred through the heat exchanger 207. In this sense, the heat exchanger 207 may be constructed from metal or any other thermally conductive material capable of being heated upon the circulation of a heated thermal fluid through interior first fluid pathway.

In such embodiments where the first fluid is fuel and the second fluid is thermal fluid, the circulation of the thermal fluid through the second fluid pathways 320 may result in the rising of the temperature of the main body 302 of the heat exchanger 207. The longer that the thermal fluid is circulated through the second fluid pathways 320, the warmer the main body 302 (along with the first and second removable endcaps 305, 308, in some embodiments) becomes, until the material of the main body 302 reaches the same temperature as the thermal fluid. The simultaneous passage of the fuel though the interior first fluid pathway (e.g., the straight first fluid passages 326, and the first fluid plenums 328 or the first and second annular cavities 628, 629) defined in the material of the main body 302 may thus result in the heating of the fuel that is transferred through the heat exchanger 207. In this sense, the heat exchanger 207 may be constructed from metal or any other thermally conductive material capable of being heated upon the circulation of a heated thermal fluid through the second fluid pathways 320.

Figure 30:
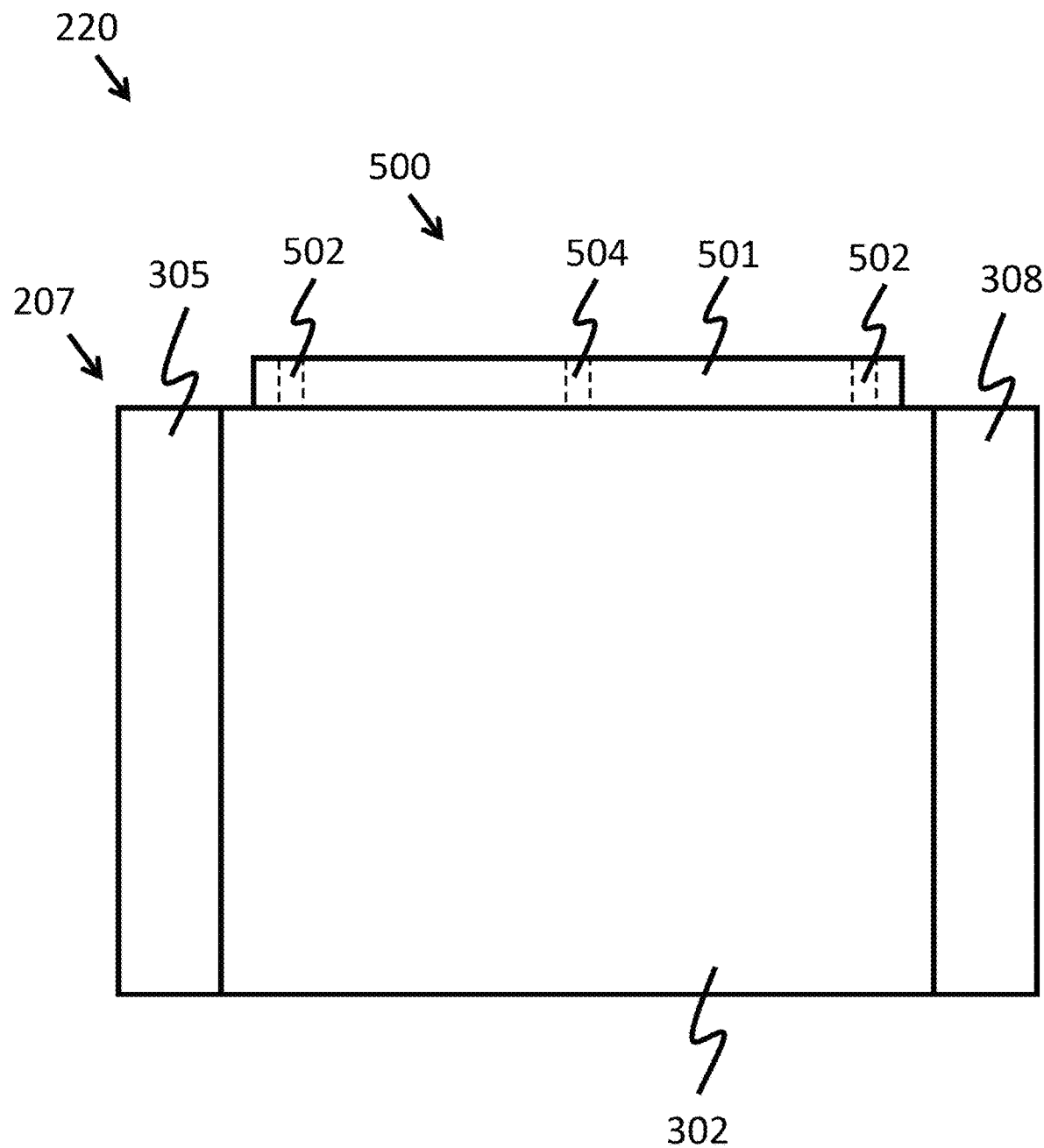
FIG. 30 depicts a side view of an embodiment of a heat exchanger with a bracket in accordance with the present disclosure.
Figure 31:
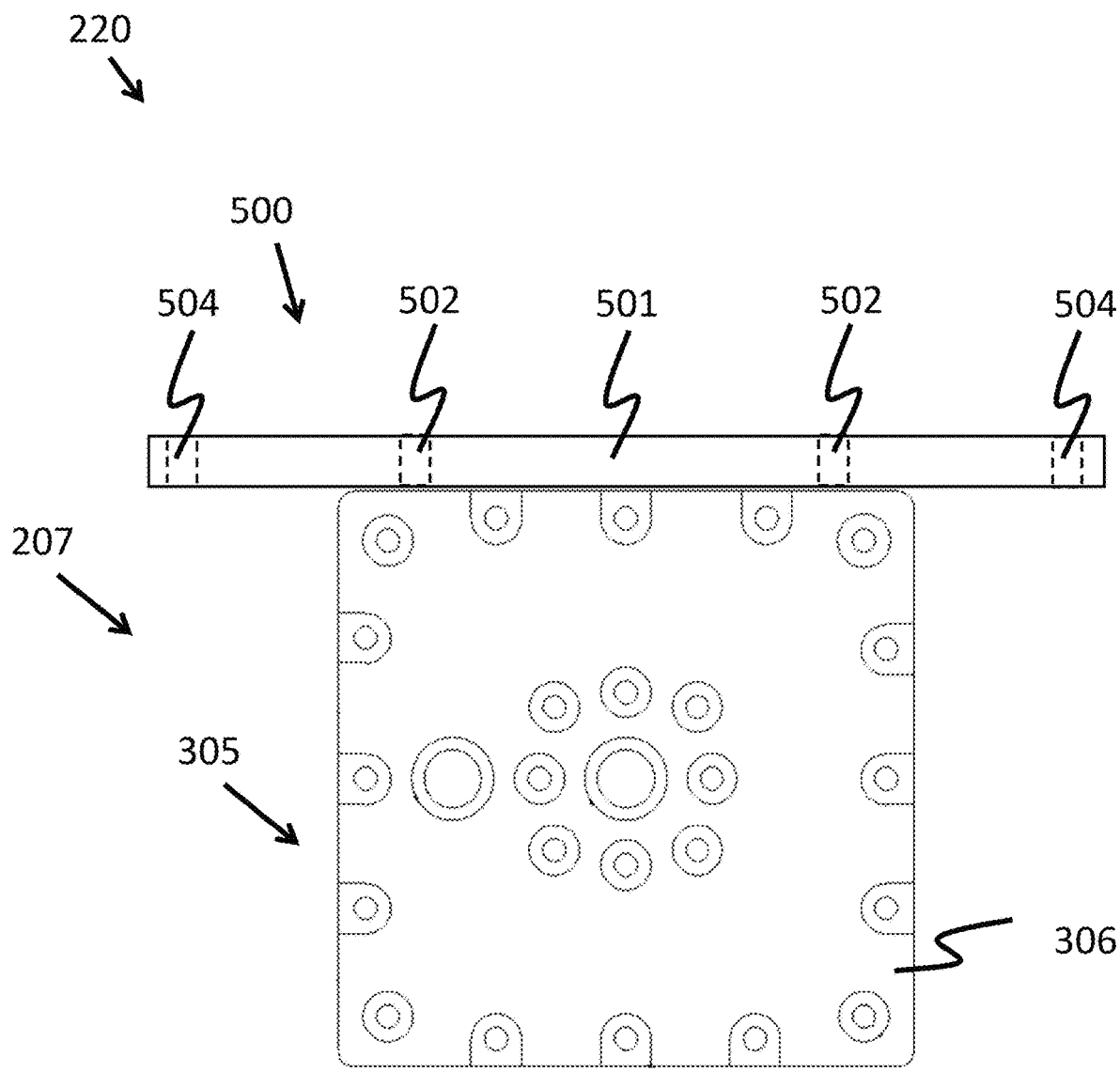
FIG. 31 depicts a top view of an embodiment of a heat exchanger with a bracket in accordance with the present disclosure.
Figure 32:
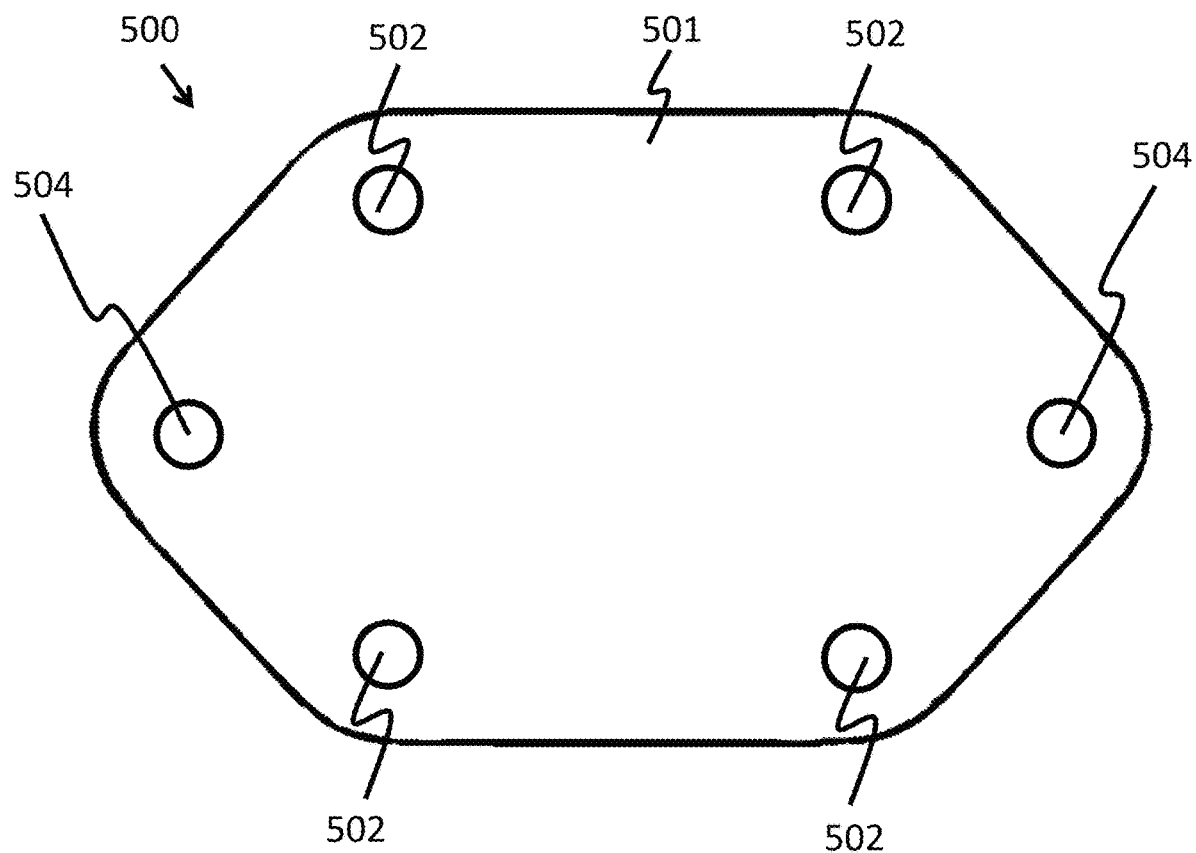
FIG. 32 depicts a top view of a bracket for a heat exchanger in accordance with the present disclosure.

Referring particularly to FIGS. 30-32, the fuel heating apparatus 220 may include a bracket 500 in order to secure the heat exchanger 207 to the vehicle 16, according to some embodiments of the present disclosure. The bracket 500 may include a bracket body 501, one or more heat exchanger attachment points 502, and one or more vehicle attachment points 504. The heat exchanger attachment points 502 and the vehicle attachment points 504 may be threaded or smooth-bore holes extending through the bracket body 501. For example, one or more mechanical fasteners (e.g., screws, nuts, bolts, etc.) may extend through the heat exchanger attachment points 502 in order to engage corresponding points (e.g., threaded holes) on the heat exchanger 207, thereby securing the bracket body 501 to the heat exchanger 207. Similarly, one or more mechanical fasteners may extend through the vehicle attachment points 504 in order to engage corresponding points on the vehicle 16 (e.g., the underside of the vehicle 16, the frame of the vehicle 16, etc.). As shown with particular reference to FIG. 30, the bracket body 501 may form an oblong or other elongate shape, in order to facilitate attachment points on the heat exchanger 207, while also facilitating attachment points on the vehicle 16.

In further embodiments, the present disclosure provides an apparatus and method for reducing pollutant emissions. By heating the fuel prior to delivering the fuel to the engine for combustion using a heat exchanger as described herein, experimental results confirm a fuel efficiency increase in a range of up to twenty-eight percent when driving at a speed of fifty-five to sixty miles-per-hour. Further increases in fuel efficiency may be achieved by optimization of the system, up to about 50% improvement in fuel efficiency. When less fuel is burned, fewer emissions per unit time and per mile are released into the atmosphere. It has also been observed that by pre-heating the fuel prior to combustion using a heat exchanger as described herein, the visible pollutants and particulates released from a diesel engine exhaust are reduced. As such, the present disclosure provides devices and methods for improving fuel efficiency and also for reducing emissions of harmful pollutants during combustion.

In a further embodiment, the present disclosure provides a method of improving the fuel efficiency of an internal combustion engine by passing a working thermal fluid such as engine coolant, engine oil, transmission fluid, or another thermal fluid source through a heat exchanger simultaneously with fuel upstream of the engine to recapture heat from the working thermal fluid and to transfer the heat to the fuel for pre-heating the fuel prior to delivery to the engine for combustion. This feature allows pre-heating of the fuel without incurring additional losses associated with heat generation, as the thermal energy of the already-heated working thermal fluid may be transferred at no cost to the fuel.

Thus, although there have been described particular embodiments of the present invention of a new and useful FUEL HEATING APPARATUS AND METHODS, it is not intended that such references be construed as limitations upon the scope of this invention except as set forth in the following claims

What is claimed is:

1. A fuel heating apparatus, comprising:
   a main body;
   a first removable end plate secured to a first end of the main body, the first removable end plate having a first fluid inlet opening configured to receive a first fluid and a second fluid inlet opening configured to receive a second fluid; and
   a second removable end plate secured to a second end of the main body opposite the first end of the main body, the second removable end plate having a first fluid outlet opening in fluid communication with the first fluid inlet opening and configured to eject the first fluid, and a second fluid outlet opening in fluid communication with the second fluid inlet opening and configured to eject the second fluid,
   wherein the main body has an interior first fluid pathway defined therein that connects the first fluid inlet opening to the first fluid outlet opening, the interior first fluid pathway traveling from a first fluid start point in fluid communication with the first fluid inlet opening to a first fluid end point in fluid communication with the first fluid outlet opening,
   wherein the interior first fluid pathway travels from the first fluid start point and back and forth between the first and second removable end plates a plurality of times before reaching the first fluid end point, and wherein the main body has a plurality of second fluid pathways defined therein that connect the second fluid inlet opening to the second fluid outlet opening, the plurality of second fluid pathways traveling from a second fluid start point in fluid communication with the second fluid inlet opening to a second fluid end point in fluid communication with the second fluid outlet opening.

2. The fuel heating apparatus of claim 1, wherein the first and second removable end plates are secured to the main body via a plurality of threaded fasteners.

3. The fuel heating apparatus of claim 2, wherein the second fluid inlet opening is located at the center of the first removable end plate and on a longitudinal axis of the main body, the second fluid outlet opening is located at the center of the second removable end plate and on the longitudinal axis of the main body, the second fluid inlet opening separates into the plurality of second fluid pathways at the second fluid start point, the plurality of second fluid pathways travel straight along the longitudinal axis of the main body, and the plurality of second fluid pathways converge at the thermal fluid end point.

4. The fuel heating apparatus of claim 3, wherein the interior first fluid pathway includes a plurality of first fluid plenums defined on the first and second ends of the main body and a plurality of straight first fluid passages each in fluid communication with two of the plurality of first fluid plenums, and each of the plurality of first fluid plenums are configured to adjust the position of the interior first fluid pathway relative to the longitudinal axis of the main body such that the interior first fluid pathway completes, relative to the longitudinal axis of the main body, a circular path about the plurality of interior thermal fluid pathways.

5. The fuel apparatus of claim 4, wherein the first fluid is a thermal fluid, and the second fluid is fuel, the first fluid inlet opening is connected to a heat exchange reservoir, the second fluid inlet opening is connected to a fuel tank, the first fluid outlet opening is connected to the heat exchange reservoir, and the second fluid outlet opening is connected to an engine.

6. The fuel heating apparatus of claim 5, wherein the plurality of second fluid pathways includes four second fluid pathways, the plurality of straight first fluid passages includes thirty straight first fluid passages, the plurality of first fluid plenums includes sixteen first fluid plenums, one first fluid plenum on the first side of the main body is in fluid communication with two of the plurality of straight first fluid passages and the first fluid inlet opening, seven of the plurality of first fluid plenums on the first side of the main body are each in fluid communication with four of the plurality of straight first fluid passages, one plenum on the second side of the main body is in fluid communication with two of the plurality of straight first fluid passages and the first fluid outline opening, and seven of the plurality of first fluid plenums on the second side of the main body are each in fluid communication with four of the plurality of the straight first fluid passages.

7. The fuel heating apparatus of claim 6, wherein the first and second removable end plates have identical physical dimensions and are interchangeable, the plurality of threaded fasteners includes forty-eight threaded fasteners, sixteen of the plurality of threaded fasteners are located, relative to the longitudinal axis of the main body, in between the plurality of second fluid pathways and the interior first fluid pathway, and thirty-two of the plurality of threaded fasteners are located, relative to the longitudinal axis of the main body, outside of the interior first fluid pathway.

8. A method of heating fuel, comprising:
providing a heat exchanger including:
a main body,
a first removable end plate secured to a first end of the main body, the first removable end plate having a first fluid inlet opening,
a second removable end plate secured to a second end of the main body opposite the first end of the main body, the second removable end plate having a first fluid outlet opening in fluid communication with the first fluid inlet opening, and a second fluid outlet opening in fluid communication with the second fluid inlet opening,
wherein the main body includes an interior first fluid pathway defined therein that connects the first fluid inlet opening to the first fluid outlet opening, the interior first fluid pathway traveling from a first fluid start point in fluid communication with the first fluid inlet opening to a first fluid end point in fluid communication with the first fluid outlet opening,
wherein the interior first fluid pathway travels from the first fluid start point and back and forth between the first and second removable end plates a plurality of times before reaching the first fluid end point, and
wherein the main body includes a plurality of second fluid pathways defined therein that connect the second fluid inlet opening to the second fluid outlet opening, the plurality of second fluid pathways traveling from a second fluid start point in fluid communication with the second fluid inlet opening to a second fluid end point in fluid communication with the second fluid outlet opening;
passing a first fluid into the first fluid inlet opening, through the interior first fluid pathway, out of the first fluid outlet opening;
simultaneously passing a second fluid into the second fluid inlet opening, through the plurality of second fluid pathways, and out of the second fluid outlet opening, wherein the second fluid does not contact the first fluid;
transferring heat between the first and second fluids; and
delivering one of the first and second fluids to an engine.

9. The method of claim 8, wherein the second fluid inlet opening is located at the center of the first removable end plate and on a longitudinal axis of the main body, the second fluid outlet opening is located at the center of the second removable end plate and on the longitudinal axis of the main body, the second fluid inlet opening separates into the plurality of second fluid pathways at the second fluid start point, the plurality of second fluid pathways travel straight along the longitudinal axis of the main body, and the plurality of second fluid pathways converge at the thermal fluid end point.

10. The method of claim 9, wherein the interior first fluid pathway includes a plurality of first fluid plenums defined on the first and second ends of the main body and a plurality of straight first fluid passages each in fluid communication with two of the plurality of first fluid plenums, and each of the plurality of first fluid plenums are configured to adjust the position of the interior first fluid pathway relative to the longitudinal axis of the main body such that the interior first fluid pathway completes, relative to the longitudinal axis of the main body, a circular path about the plurality of interior thermal fluid pathways.

11. The method of claim 10, wherein the first fluid is a thermal fluid, the second fluid is fuel, the first fluid inlet opening is connected to a fuel tank, the first fluid inlet opening is connected to a heat exchange reservoir, the second fluid inlet opening is connected to the engine, and the first fluid outlet opening is connected to the heat exchange reservoir, such that and the second fluid is delivered to the engine, the first fluid transfers heat to the second fluid inside the heat exchanger prior to delivery of the second fluid to the engine, and such that a temperature of the second fluid is increased while passing through the heat exchanger.

12. The method of claim 11, wherein the interior first fluid pathway travels from the fuel start point and back and forth between the first and second removable end plates a plurality of times before reaching the fuel end point.

13. A vehicle fuel heating apparatus comprising:
a vehicle;
an engine disposed on the vehicle;
a fuel tank disposed on the vehicle;
a fuel line disposed on the vehicle between the engine and the fuel tank;
a heat exchanger reservoir disposed on the vehicle; and
a heat exchanger disposed on the fuel line,
wherein the heat exchanger includes:
a main body;
a first removable end plate secured to a first end of the main body, the first removable end plate having a first fluid inlet opening configured to receive a thermal fluid from the heat exchanger reservoir and a second fluid inlet opening configured to receive fuel from the fuel tank,
a second removable end plate secured to a second end of the main body opposite the first end of the main body, the second removable end plate having a first fluid outlet opening in fluid communication with the first fluid inlet opening and configured to return the thermal fluid to the heat exchanger reservoir, and a second fluid outlet opening in fluid communication with the second fluid inlet opening and configured to provide the fuel to the engine,
wherein the main body has an interior first fluid pathway defined therein that connects the first fluid inlet opening to the first fluid outlet opening, the interior first fluid pathway traveling from a first fluid start point in fluid communication with the first fluid inlet opening to a first fluid end point in fluid communication with the first fluid outlet opening,
wherein the interior first fluid pathway travels from the first fluid start point and back and forth between the first and second removable end plates a plurality of times before reaching the first fluid end point,
wherein the main body has a plurality of second fluid pathways defined therein that connect the second fluid inlet opening to the second fluid outlet opening, the plurality of second fluid pathways traveling from a second fluid start point in fluid communication with the second fluid inlet opening to a second fluid end point in fluid communication with the second fluid outlet opening, and wherein the first and second removable end plates are secured to the main body via a plurality of threaded fasteners.

14. The fuel heating apparatus of claim 13, wherein the second fluid inlet opening is located at the center of the first removable end plate and on a longitudinal axis of the main body, the second fluid outlet opening is located at the center of the second removable end plate and on the longitudinal axis of the main body, the second fluid inlet opening separates into the plurality of second fluid pathways at the second fluid start point, the plurality of second fluid pathways travel straight along the longitudinal axis of the main body, and the plurality of second fluid pathways converge at the thermal fluid end point.

15. The fuel heating apparatus of claim 14, wherein the interior first fluid pathway includes a plurality of first fluid plenums defined on the first and second ends of the main body and a plurality of straight first fluid passages each in fluid communication with two of the plurality of first fluid plenums, and each of the plurality of first fluid plenums are configured to adjust the position of the interior first fluid pathway relative to the longitudinal axis of the main body such that the interior first fluid pathway completes, relative to the longitudinal axis of the main body, a circular path about the plurality of interior thermal fluid pathways.

16. The fuel heating apparatus of claim 15, wherein the plurality of second fluid pathways includes four second fluid pathways, the plurality of straight first fluid passages includes thirty straight first fluid passages, the plurality of first fluid plenums includes sixteen first fluid plenums, one first fluid plenum on the first side of the main body is in fluid communication with two of the plurality of straight first fluid passages and the first fluid inlet opening, seven of the plurality of first fluid plenums on the first side of the main body are each in fluid communication with four of the plurality of straight first fluid passages, one plenum on the second side of the main body is in fluid communication with two of the plurality of straight first fluid passages and the first fluid outline opening, and seven of the plurality of first fluid plenums on the second side of the main body are each in fluid communication with four of the plurality of the straight first fluid passages.

17. The fuel heating apparatus of claim 16, wherein the first and second removable end plates have identical physical dimensions and are interchangeable, the plurality of threaded fasteners includes forty-eight threaded fasteners, sixteen of the plurality of threaded fasteners are located, relative to the longitudinal axis of the main body, in between the plurality of second fluid pathways and the interior first fluid pathway, and thirty-two of the plurality of threaded fasteners are located, relative to the longitudinal axis of the main body, outside of the interior first fluid pathway.

* * * * *